US012756237B2

(12) United States Patent
Peralta et al.

(10) Patent No.: US 12,756,237 B2
(45) **Date of Patent: *Oct. 6, 2026**

(54) SYSTEMS AND METHODS FOR DYNAMICALLY TUNING A WIRELESS POWER TRANSFER SYSTEM

(71) Applicant: NuCurrent, Inc., Chicago, IL (US)

(72) Inventors: Alberto Peralta, Chicago, IL (US); Pavel Shostak, San Diego, CA (US); Jim Crnkovic, Chicago, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/642,131

(22) Filed: Apr. 8, 2026

(65) Prior Publication Data

US 2026/0246304 A1 Aug. 20, 2026

Related U.S. Application Data

(63) Continuation of application No. 19/003,826, filed on Dec. 27, 2024, which is a continuation of application (Continued)

(51) Int. Cl.
*H01F 38/14* (2006.01)
*H02J 50/10* (2016.01)
(Continued)

(52) U.S. Cl.
CPC .............. *H02J 50/20* (2016.02); *H02J 50/12* (2016.02); *H02J 50/80* (2016.02)

(58) Field of Classification Search
CPC ............. H02J 50/20; H02J 50/12; H02J 50/80
See application file for complete search history.

(56) References Cited

U.S. PATENT DOCUMENTS 9,508,487 B2 11/2016 Von Novak et al.
9,960,629 B2 5/2018 Rajagopalan et al.
(Continued)

FOREIGN PATENT DOCUMENTS

CN 108463938 A 8/2018
CN 108718116 A 10/2018
(Continued)

OTHER PUBLICATIONS

*Nucurrent, Inc.* V. *Hong Kong Ugreen Ltd.*, E.D. of Texas, Case No. 2:25-CV-779-JRG, Defendants Hong Kong Ugreen Limited and Ugreen Group Ltd's Answer, Affirmative Defenses, Counterclaims to Plaintiff NuCurrent, Inc.'s Second Amended Complaint, Jun. 11, 2026, 31 pages.
(Continued)

*Primary Examiner* — Elim Ortiz
(74) *Attorney, Agent, or Firm* — Lee Sullivan Shea & Smith LLP

(57) ABSTRACT

A wireless power transmission system includes a voltage regulator, an inverter, a capacitor circuit, an antenna, and a controller. The inverter receives a first alternating current (AC) signal that has a configurable frequency and produces a configurable supply voltage. The inverter produces a second AC signal based on the first AC signal and the configurable supply voltage. The second AC signal has the configurable frequency and a configurable power level that corresponds to the configurable supply voltage. The capacitor circuit includes two or more capacitors and is configured to, based on a configuration state of the bank of two or more capacitors, tune the second AC signal with the bank of two or more capacitors and thereby produce a third AC signal. The controller is configured to define the configurable frequency, define the level of the configurable supply voltage, and define the configuration state.

20 Claims, 12 Drawing Sheets

Related U.S. Application Data

No. 18/778,704, filed on Jul. 19, 2024, now Pat. No. 12,184,084, which is a continuation of application No. 18/464,756, filed on Sep. 11, 2023, now Pat. No. 12,470,089, which is a continuation of application No. 16/733,517, filed on Jan. 3, 2020, now Pat. No. 11,757,307.

(51) Int. Cl.

| | |
|---|---|
| ***H02J 50/12*** | (2016.01) |
| ***H02J 50/20*** | (2016.01) |
| ***H02J 50/80*** | (2016.01) |
| ***H02J 50/90*** | (2016.01) |

(56) References Cited

U.S. PATENT DOCUMENTS

| | | | | |
|---|---|---|---|---|
| 10,128,688 | B2 | 11/2018 | Von Novak, III et al. | |
| 10,205,351 | B2 | 2/2019 | Lee | |
| 10,211,663 | B2 | 2/2019 | Matsuyuki et al. | |
| 10,291,073 | B2 | 5/2019 | Trudeau et al. | |
| 10,333,333 | B2 | 6/2019 | Ritter et al. | |
| 10,454,309 | B2 | 10/2019 | Byun | |
| 10,536,035 | B2 | 1/2020 | Joye et al. | |
| 10,608,475 | B2 | 3/2020 | Bae et al. | |
| 10,637,295 | B2 | 4/2020 | Mao | |
| 10,727,684 | B2 | 7/2020 | Son et al. | |
| 10,978,246 | B2 | 4/2021 | Bae | |
| 10,978,921 | B1 | 4/2021 | Wang et al. | |
| 11,038,376 | B2 | 6/2021 | Hemphill et al. | |
| 11,081,911 | B1 | 8/2021 | Nalbant et al. | |
| RE49,017 | E | 4/2022 | Bae | |
| 11,316,383 | B1 | 4/2022 | Terry | |
| 11,437,864 | B2 | 9/2022 | Kim et al. | |
| 11,476,724 | B2 | 10/2022 | Peralta et al. | |
| 11,496,626 | B2 | 11/2022 | Bergher et al. | |
| 11,515,738 | B2 | 11/2022 | Louis et al. | |
| 11,735,962 | B2 | 8/2023 | Schwartz et al. | |
| 11,764,621 | B1 | 9/2023 | Hu et al. | |
| 11,784,512 | B2 | 10/2023 | Narayanan et al. | |
| 11,876,386 | B2 | 1/2024 | Luzinski et al. | |
| 11,949,249 | B2 | 4/2024 | Muratov | |
| 11,997,836 | B1 | 5/2024 | Thirumalai Ananthan Pillai et al. | |
| 2011/0148215 | A1* | 6/2011 | Marzetta | H02J 50/12 307/104 |
| 2013/0099584 | A1 | 4/2013 | Von Novak, III | |
| 2014/0028110 | A1 | 1/2014 | Petersen et al. | |
| 2015/0115735 | A1 | 4/2015 | Singh et al. | |
| 2016/0064997 | A1 | 3/2016 | Hur et al. | |
| 2016/0096435 | A1 | 4/2016 | Lee et al. | |
| 2016/0141882 | A1* | 5/2016 | Ichikawa | H02J 50/12 307/104 |
| 2016/0181850 | A1 | 6/2016 | Toivola et al. | |
| 2016/0372961 | A1 | 12/2016 | Ritter et al. | |
| 2017/0085133 | A1 | 3/2017 | Byun | |
| 2017/0101016 | A1 | 4/2017 | Seong et al. | |
| 2017/0163097 | A1 | 6/2017 | Kim et al. | |
| 2017/0187240 | A1 | 6/2017 | Cho et al. | |
| 2017/0237296 | A1 | 8/2017 | Keith et al. | |
| 2017/0279313 | A1 | 9/2017 | Hu et al. | |
| 2017/0310164 | A1 | 10/2017 | Abdolkhani et al. | |
| 2017/0324283 | A1 | 11/2017 | Walton | |
| 2017/0338695 | A1 | 11/2017 | Port | |
| 2017/0353053 | A1 | 12/2017 | Muratov | |
| 2018/0019597 | A1 | 1/2018 | Baarman | |
| 2018/0034324 | A1 | 2/2018 | Abdolkhani | |
| 2018/0069435 | A1 | 3/2018 | Sakata et al. | |
| 2018/0123392 | A1 | 5/2018 | Pinciuc et al. | |
| 2018/0138718 | A1 | 5/2018 | Adolf et al. | |
| 2018/0226835 | A1 | 8/2018 | Baarman et al. | |
| 2018/0233942 | A1 | 8/2018 | Qiu et al. | |
| 2018/0233954 | A1 | 8/2018 | Yang et al. | |
| 2018/0233956 | A1 | 8/2018 | Moussaoui et al. | |
| 2018/0241248 | A1* | 8/2018 | Pan | H02J 50/10 |
| 2019/0280527 | A1* | 9/2019 | Smith | A61M 60/538 |
| 2019/0305595 | A1 | 10/2019 | Mantha et al. | |
| 2020/0169121 | A1 | 5/2020 | Keith et al. | |
| 2020/0227951 | A1 | 7/2020 | Park et al. | |
| 2021/0028651 | A1 | 1/2021 | Goodchild et al. | |
| 2021/0203193 | A1 | 7/2021 | Kim et al. | |
| 2021/0408840 | A1 | 12/2021 | Peralta et al. | |
| 2021/0408841 | A1 | 12/2021 | Peralta et al. | |
| 2022/0200356 | A1 | 6/2022 | Luzinski et al. | |
| 2022/0337093 | A1 | 10/2022 | Draak et al. | |
| 2022/0385117 | A1 | 12/2022 | Moritomo | |
| 2022/0407369 | A1 | 12/2022 | Hu et al. | |
| 2023/0048919 | A1 | 2/2023 | Park | |
| 2023/0370115 | A1 | 11/2023 | Schwartz et al. | |
| 2023/0378822 | A1 | 11/2023 | Abukhalaf et al. | |
| 2023/0420998 | A1 | 12/2023 | Terry et al. | |

FOREIGN PATENT DOCUMENTS

| | | | |
|---|---|---|---|
| CN | 108923503 | A | 11/2018 |
| CN | 110350675 | A | 10/2019 |
| EP | 3756266 | B1 | 4/2022 |
| KR | 20170042944 | A | 4/2017 |
| KR | 20180081950 | A | 7/2018 |
| WO | 2017138712 | A1 | 8/2017 |
| WO | 2017144387 | A1 | 8/2017 |

OTHER PUBLICATIONS

CN Office Action, CN Application No. 202180014083.8 dated Dec. 4, 2025, 15 pages.

Defendant's Invalidity Contentions, *NuCurrent, LLC* vs. *Hong Kong Ugreen Limited and Ugreen Group Ltd.*, The U.S. District Court for the Eastern District of Texas, Marshall Division, Civil Action No. 2:25-cv-779-JRG, Jan. 26, 2026, 99 pages.

EP Application 21736188.0, EP Extended Search Report, dated Dec. 18, 2023, 8 pages.

Exhibit A-01: Invalidity Contentions: U.S. Pat. No. 12,184,084 in view of U.S. Patent App. No. 2018/0019597 ("Baarman"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 82 pages.

Exhibit A-02: Invalidity Contentions: U.S. Pat. No. 12,184,084 in view of U.S. Pat. App. No. 2017/0187240 ("Cho"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 209 pages.

Exhibit A-03: Invalidity Contentions: U.S. Pat. No. 12,184,084 in view of U.S. 2017/0163097 ("Kim"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 82 pages.

Exhibit A-04: Invalidity Contentions: U.S. Pat. No. 12,184,084 in view of U.S. 2017/0353053 ("Muratov"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 64 pages.

Exhibit A-05: Invalidity Contentions: U.S. Pat. No. 12,184,084 in view of U.S. Pat. App. No. 2020/0227951 ("Park"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 79 pages.

Exhibit A-06: Invalidity Contentions: U.S. Pat. No. 12,184,084 in view of WO 2017/144387 ("Van Wageningen"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 117 pages.

Exhibit A-07: Invalidity Contentions: U.S. Pat. No. 12,184,084 in view of Qi Wireless Power Transfer System Version 1.2.3 ("Qi 1.2.3"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 184 pages.

Exhibit B-01: Invalidity Contentions: U.S. Pat. No. 12,272,970 in view of U.S. Pat. App. No. 2017/0187240 ("Cho"), *NuCurrent, LLC*

(56) References Cited

OTHER PUBLICATIONS v. *Hong Kong Ugreen Limited and Ugreen Group Ltd.*, Case No. 2:25-cv-779-JRG, U.S. District Court for the Eastern District of Texas, Marshall Division, Jan. 26, 2026, 98 pages.
Exhibit B-02: Invalidity Contentions: U.S. Pat. No. 12,272,970 in view of U.S. Pat. App. No. 2017/0163097 ("Kim"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 149 pages.
Exhibit B-03: Invalidity Contentions: U.S. Pat. No. 12,272,970 in view of U.S. Pat. App. No. 2018/0241248 ("Pan"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 166 pages.
Exhibit B-04: Invalidity Contentions: U.S. Pat. No. 12,272,970 in view of U.S. Pat. App. No. 2016/0181850 ("Tiovola"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 144 pages.
Exhibit B-05: Invalidity Contentions: U.S. Pat. No. 12,272,970 in view of WO 2017/144387 ("Van Wageningen"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 222 pages.
Exhibit B-06: Invalidity Contentions: U.S. Pat. No. 12,272,970 in view of "A Flexible Wireless Power Transfer System With Switch Controlled Capacitor" to Zhao et al. ("Zhao"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 137 pages.
Exhibit B-07: Invalidity Contentions: U.S. Pat. No. 12,272,970 in view of Qi Wireless Power Transfer System Version 1.2.3 ("Qi 1.2.3"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 157 pages.
Exhibit C-01: Invalidity Contentions: U.S. Pat. No. 12,463,470 in view of EP3756266B1 to Ettes et al. ("Ettes"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 95 pages.
Exhibit C-02: Invalidity Contentions: U.S. Pat. No. 12,463,470 in view of U.S. Pat. App. No. 2021/0028651 to Goodchild et al. ("Goodchild"), *NuCurrent, LLC* v. *Hong Kong Ugreen Limited and Ugreen Group Ltd.*, Case No. 2:25- CV-779-JRG, U.S. District Court for the Eastern District of Texas, Marshall Division, Jan. 26, 2026, 162 pages.
Exhibit C-03: Invalidity Contentions: U.S. Pat. No. 12,463,470 in view of U.S. Pat. App. No. 2021/0203193 ("Kim"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 127 pages.
Exhibit C-04: Invalidity Contentions: U.S. Pat. No. 12,463,470 in view of U.S. Pat. App. No. 2022/0385117 ("Moritomo"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 115 pages.
Exhibit C-05: Invalidity Contentions: U.S. Pat. No. 12,463,470 in view of U.S. Pat. App. No. 2018/0069435 to Sakata et al. ("Sakata"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 147 pages.
Exhibit C-06: Invalidity Contentions: U.S. Pat. No. 12,463,470 in view of U.S. Pat. 11,316,383 to Terry et al. ("Terry"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 113 pages.
Exhibit D-01: Invalidity Contentions: U.S. Pat. No. 12,438,573 in view of U.S. Pat. App. No. 2018/0226835 ("Baarman"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 122 pages.
Exhibit D-02: Invalidity Contentions: U.S. Pat. No. 12,438,573 in view of U.S. Pat. App. No. 2018/0138718 ("Adolf"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 205 pages.
Exhibit D-03: Invalidity Contentions: U.S. Pat. No. 12,438,573 in view of WO2017138712 ("Chae"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 209 pages.
Exhibit D-04: Invalidity Contentions: U.S. Pat. No. 12,438,573 in view of U.S. Pat. App. No. 2022/0337093 ("Draak"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 130 pages.
Exhibit D-05: Invalidity Contentions: U.S. Pat. No. 12,438,573 in view of U.S. Pat. App. No. 2016/0064997 ("Hur"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 87 pages.
Exhibit D-06: Invalidity Contentions: U.S. Pat. No. 12,438,573 in view of U.S. Pat. App. No. 2020/0169121 ("Keith"), *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 195 pages.
Exhibit D-07: Invalidity Contentions: U.S. Pat. No. 12,438,573 in view of Additional Prior Art, *NuCurrent, LLC* v. *Hong Kong Ugreen Limited and Ugreen Group Ltd.*, Case No. 2:25-cv-779-JRG, U.S. District Court for the Eastern District of Texas, Marshall Division, Jan. 26, 2026, 186 pages.
IN Application No. 202247044238, First Examination Report, Jun. 5, 2024, 6 pages.
"Introduction to the Power Class 0 Specification", Wireless Power Consortium, Version 1.2.3, Feb. 2017, 16 pages.
Invalidity Chart for U.S. Pat. No. 12,184,084 in view of U.S. 2017/0163097 Kim, , *NuCurrent, Inc.* V. *Hong Kong Ugreen Ltd., et al.*, E.D. Texas, Case No. 2:25-cv-00779, Jan. 20, 2026, 16 pages.
Invalidity Chart for U.S. Pat. No. 12,184,084 in view of U.S. 2017/0353053 Muratov, *NuCurrent, Inc.* V. *Hong Kong Ugreen Ltd., et al.*, E.D. Texas, Case No. 2:25-cv-00779, Jan. 20, 2026, 15 pages.
Invalidity Chart for U.S. Pat. No. 12,184,084 in view of U.S. 2018/0019597 Baarman, *NuCurrent, Inc.* V. *Hong Kong Ugreen Ltd., et al.*, E.D. Texas, Case No. 2:25-cv-00779, Jan. 20, 2026, 16 pages.
Invalidity Chart for U.S. Pat. No. 12,272,970 in view of U.S. 2017/0163097 Kim and U.S. 2018/0241248 Pan, *NuCurrent, Inc.* V. *Hong Kong Ugreen Ltd., et al.*, E.D. Texas, Case No. 2:25-cv-00779, Jan. 20, 2026, 14 pages.
Invalidity Chart for U.S. Pat. No. 12,272,970 in view of U.S. 2018/0241248 Pan, *NuCurrent, Inc.* V. *Hong Kong Ugreen Ltd., et al.*, E.D. Texas, Case No. 2:25-cv-00779, Jan. 20, 2026, 11 pages.
Invalidity Chart for U.S. Pat. No. 12,438,573 in view of U.S. 2017/0163097 Kim and U.S. 2016/0064997 Hur, *NuCurrent, Inc.* V. *Hong Kong Ugreen Ltd., et al.*, E.D. Texas, Case No. 2:25-cv-00779, Jan. 20, 2026, 9 pages.
Invalidity Chart for U.S. Pat. No. 12,438,573 in view of U.S. 2022/0337093 Draak, *NuCurrent, Inc.* V. *Hong Kong Ugreen Ltd., et al.*, E.D. Texas, Case No. 2:25-cv-00779, Jan. 20, 2026, 10 pages.
Invalidity Chart for U.S. Pat. No. 12,463,470 in view of U.S. Pat. No. 11,316,383 Terry and US 2022/0385117 Moritomo, *NuCurrent, Inc.* V. *Hong Kong Ugreen Ltd., et al.*, E.D. Texas, Case No. 2:25-cv-00779, Jan. 20, 2026, 17 pages.
Invalidity Chart for U.S. Pat. No. 12,463,470 in view of U.S. 2018/0069435 Sakata, *NuCurrent, Inc.* V. *Hong Kong Ugreen Ltd., et al.*, E.D. Texas, Case No. 2:25-cv-00779, Jan. 20, 2026, 14 pages.
PCT/US2021/012113 International Search Report and Written Opinion dated Apr. 30, 2021, 8 pages.
Qi Specification: MPP System Specification and MPP Communications Protocol, Wireless Power Consortium [online], Version 2.0, Apr. 2023, [retrieved Jan. 22, 2025], Retrieved from the Internet:

(56) References Cited

OTHER PUBLICATIONS

URL: https://www.wirelesspowerconsortium.com/knowledge-base/specifications/download-the-qi-specifications, 268 pages.
Qi Specification, Wireless Power Consortium [online], Version 1.3, Jan. 2021, [retrieved May 21, 2024], Retrieved from the Internet: URL: https://www.wirelesspowerconsortium.com/knowledge-base/specifications/download-the-qi-specifications/, 746 pages.
Qi Specification, Wireless Power Consortium [online], Version 2.0, Apr. 2023, [retrieved Jan. 22, 2025], Retrieved from the Internet: URL: https://www.wirelesspowerconsortium.com/knowledge-base/specifications/download-the-qi-specifications, 664 pages.
"The Qi Wireless Power Transfer System Power Class 0 Specification, Part 4: Reference Designs", Wireless Power Consortium, Version 1.2.3, Feb. 2017, 336 pages.
"The Qi Wireless Power Transfer System Power Class 0 Specification, Parts 1 and 2: Interface Definitions", Wireless Power Consortium, Version 1.2.3, Feb. 2017, 165 pages.
Zhao, Jin et al., "A Flexible Wireless Power Transfer System With Switch Controlled Capacitor", IEEE Access, vol. 7, 2019, pp. 106873-106881.
EP Extended Search Report, EP Application No. 26152670.1, dated May 11, 2026, 13 pages.

* cited by examiner

SYSTEMS AND METHODS FOR DYNAMICALLY TUNING A WIRELESS POWER TRANSFER SYSTEM

CROSS-REFERENCE TO RELATED APPLICATIONS

This application is a continuation of, and claims priority to, U.S. Non-Provisional App. No. U.S. Ser. No. 19/003,826, filed Dec. 27, 2024, and entitled "SYSTEMS AND METHODS FOR DYNAMICALLY TUNING A WIRELESS POWER TRANSFER SYSTEM," which, in turn is a continuation of, and claims priority to, U.S. Non-Provisional App. No. U.S. Ser. No. 18/778,704, filed Jul. 19, 2024, and entitled "SYSTEMS AND METHODS FOR DYNAMICALLY TUNING A WIRELESS POWER TRANSFER SYSTEM," which, in turn is a continuation of, and claims priority to, U.S. Non-Provisional application Ser. No. 18/464,756, filed Sep. 11, 2023, and entitled "SYSTEMS AND METHODS FOR DYNAMICALLY TUNING A WIRELESS POWER TRANSFER SYSTEM," which, in turn is a continuation of, and claims priority to, U.S. Non-Provisional application Ser. No. 16/733,517, filed Jan. 3, 2020, and entitled "SYSTEMS AND METHODS FOR DYNAMICALLY TUNING A WIRELESS POWER TRANSFER SYSTEM," the contents of each of which are incorporated herein by reference in its entirety.

TECHNICAL FIELD

The present disclosure generally relates to systems and methods for wireless transfer of electrical power and/or electrical data signals, and, more particularly, to systems and methods for dynamically tuning one or more aspects of the system to account for one or more disturbances in the system.

BACKGROUND

Wireless power transfer systems are used in a variety of applications for the wireless transfer of electrical energy, electrical power, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmission and receiver elements will often take the form of coiled wires and/or antennas.

Transmission of one or more of electrical energy, electrical power, electromagnetic energy and electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics, bill of materials (BOM) and/or form factor constraints, among other things. It is to be noted that, "self-resonating frequency," as known to those having skill in the art, generally refers to the resonant frequency of an inductor due to the parasitic characteristics of the component.

SUMMARY

While wireless power transfer systems can be tuned and/or optimized for general use (e.g., assuming a phone charger is used indoors on a relatively electrically neutral surface), in reality, conditions affecting various aspects and/or qualities of wireless power transfer may arise. Such qualities may include a varying coil distance, external or internal system temperatures, altered impedances, among other environmental characteristics that may affect transfer of power between two coils in a wireless power transfer system. These qualities may arise as disturbances in the system.

Accordingly, as such disturbances may vary during use, it is desired to have a system that can dynamically adjust characteristics of the wireless power system, to account for such disturbances. In view of the above, new wireless transmission systems for transmission of one or more of electrical energy, electrical power, electromagnetic energy and electrical data are desired, wherein such disturbances may be detected and the system may be dynamically tuned to account for such disturbances.

In accordance with one aspect of the disclosure, a system for wireless power transfer is disclosed. The system includes a wireless transmission system, a wireless receiver system, and a dynamic tuning controller. The wireless transmission system includes, at least, a transmission antenna, the wireless transmission system configured to receive power from an input power source, configure an electrical energy signal, using the power from the input power source, for transmission by the transmission antenna. The wireless receiver system is operatively associated with a load, includes, at least, a receiver antenna and is configured to receive the electrical energy signal from the wireless transmission system, via coupling of the transmission antenna and receiver antenna, and configure the electrical energy signal to transfer power to the load. The dynamic tuning controller includes, at least, a processor and is configured to determine an output of one or more of the wireless transmission system, the wireless receiver system, and combinations thereof. The dynamic tuning controller is further configured to determine existence of one or more disturbances to one or more of the wireless transmission system, the wireless receiver system, and combinations thereof, based on the output. The dynamic tuning controller is further configured to control alterations to one or more forward gain elements of one or more of the wireless transmission system, the wireless receiver system, and combinations thereof, if one or more disturbances exist, based on the output.

In a refinement, the system further includes one or more sensors, each of the one or more sensors configured to collect output information associated with one or more of the wireless transmission system, the wireless receiver system, and any combinations thereof. In such a refinement the dynamic tuning controller is further configured to receive the output information from the one or more sensors and determining the output, by the dynamic tuning controller, is based, at least in part, on the output information.

In a further refinement, the one or more sensors includes one or more temperature sensors, each of the one or more temperature sensors configured to determine temperature information associated with one or more of the wireless transmission system, the wireless receiver system, and any combinations thereof. In such a refinement, the dynamic tuning controller is further configured to receive the temperature information from the one or more temperature sensors and determining the output, by the dynamic tuning controller, is based, at least in part, on one or both of the output information and the temperature information.

In another further refinement, the one or more sensors includes one or more current sensors, each of the one or more current sensors configured to determine current information associated with one or more of the wireless transmission system, the wireless receiver system, and any combinations thereof. In such a refinement, the dynamic tuning controller is further configured to receive the temperature information from the one or more temperature sensors and determining the output, by the dynamic tuning controller, is based, at least in part, on one or both of the output information and the temperature information.

In another further refinement, the one or more sensors includes one or more voltage sensors, each of the one or more voltage sensors configured to determine voltage information associated with one or more of the wireless transmission system, the wireless receiver system, and any combinations thereof. In such a refinement, the dynamic tuning controller is further configured to receive the voltage information from the one or more voltage sensors and determining the output, by the dynamic tuning controller, is based, at least in part, on one or both of the output information and the voltage information.

In another refinement, the wireless transmission system includes, at least, a transmission control system, the transmission control system configured to set an operating frequency for the wireless transmission system. In such a refinement, the one or more forward gain elements includes the operating frequency and the dynamic tuning controller is configured to control alterations to the operating frequency by the transmission control system based on, at least, the output.

In another refinement, the wireless transmission system includes, at least, a power amplifier receiving an input supply voltage. In such a refinement, the one or more forward gain elements includes input supply voltage and the dynamic tuning controller is configured to control alterations to the input supply voltage of the power amplifier based on, at least, the output.

In another refinement, the wireless transmission system includes, at least, a dynamic tuning capacitor circuit, the dynamic tuning capacitor circuit having a configurable capacitance. In such a refinement, the one or more forward gain elements includes the configurable capacitance and the dynamic tuning controller is configured to control alterations to the configurable capacitance based on, at least, the output.

In a further refinement, the dynamic tuning capacitor circuit includes a plurality of selectable capacitors and the configurable capacitance is configured by selecting one or more of the selectable capacitors and the dynamic tuning controller is configured to select one or more of the selectable capacitors.

In another refinement, the transmission antenna is a dynamically tunable transmission antenna, the dynamically tunable transmission antenna having a configurable inductance. In such a refinement, the one or more forward gain elements includes the configurable inductance and the dynamic tuning controller is configured to control alterations to the configurable inductance based on, at least, the output.

In a further refinement, the dynamically tunable transmission antenna is a multi-mode antenna having a plurality of modes, wherein the configurable inductance is configured by selecting an operating mode from the plurality of modes and the dynamic tuning controller is configured to select the operating mode from the plurality of modes.

In another refinement, the receiver antenna is a dynamically tunable receiver antenna, the dynamically tunable receiver antenna having a configurable inductance, the one or more forward gain elements includes the configurable inductance, and the dynamic tuning controller is configured to control alterations to the configurable inductance based on, at least, the output.

In a further refinement, wherein the dynamically tunable receiver antenna is a multi-mode antenna having a plurality of modes, wherein the configurable inductance is configured by selecting an operating mode from the plurality of modes and the dynamic tuning controller is configured to select the operating mode from the plurality of modes.

In another refinement, the wireless receiver system further includes dynamically tunable magnetic materials proximate to the receiver antenna, the dynamically tunable magnetic materials including a plurality of selectable magnetic materials and the dynamic tuning controller is configured to select one or more of the plurality of selectable magnetic materials based on, at least, the output.

In another refinement, the wireless transmission system further includes dynamically tunable magnetic materials proximate to the transmission antenna, the dynamically tunable magnetic materials including a plurality of selectable magnetic materials and the dynamic tuning controller is configured to select one or more of the plurality of selectable magnetic materials based on, at least, the output.

In another refinement, the wireless receiver system includes, at least, a dynamic tuning capacitor circuit, the dynamic tuning capacitor circuit having a configurable capacitance. In such a refinement, the one or more forward gain elements includes the configurable capacitance and the dynamic tuning controller is configured to control alterations to the configurable capacitance based on, at least, the output.

In another refinement, the wireless receiver system includes a rectifier to configure the electrical energy signal received by the receiver antenna for delivery to the load, the rectifier including a plurality of switchable modes, each of the switchable modes associated with a plurality of output power modes for an output power. In such a refinement, the one or more forward gain elements includes the output power and the dynamic tuning controller is configured to control alterations to the plurality of output modes based on, at least, the output.

In a further refinement, the plurality of switchable modes includes, at least, a full wave rectifier mode and a half wave rectifier mode.

In accordance with another aspect of the disclosure, a dynamic tuning system for a wireless power transfer system is disclosed. The wireless power transfer system includes, at least, a wireless transmission system and a wireless receiver system and the wireless power transfer system configured to wirelessly transfer an electrical energy signal from an input power source to a load. The dynamic tuning system includes at least one sensor configured to collect output information associated with the wireless power transfer system and a controller, the controller including a processor. The controller is configured to receiver the output information from the at least one sensor, determine an output of one or more of the wireless transmission system, the wireless receiver system, and combinations thereof, based on the output information. The controller is further configured to determine existence of one or more disturbance to one or more of the wireless transmission system, the wireless receiver system, and combinations thereof, based on the output. The controller is further configured to control alterations to one or more forward gain elements of one or more of the wireless transmission system, the wireless receiver system, and combinations thereof, if one or more disturbances exist, based on the output.

In accordance with yet another aspect of the disclosure, a method for dynamically tuning a wireless power transfer system is disclosed. The wireless power transfer system includes, at least, a wireless transmission system and a wireless receiver system and the wireless power transfer system configured to wirelessly transfer an electrical energy signal from an input power source to a load. The method includes receiving output information associated with one or more of the wireless transmission system, the wireless receiver system, and combinations thereof, from at least one sensor. The method further includes determining an output of one or more of the wireless transmission system, the wireless receiver system, and combinations thereof, based on the output information. The method further includes determining existence of one or more disturbances to one or more of the wireless transmission system, the wireless receiver system, and combinations thereof, based on the output. The method further includes controlling alterations to one or more forward gain elements of one or more of the wireless transmission system, the wireless receiver system, and combinations thereof, if one or more disturbances exist, based on the output.

To that end, the systems, apparatus, and methods disclosed herein may implement a tuning process to allow for fast convergence to an optimal or, alternatively, sufficient wireless power transfer configuration.

In some examples, the systems, apparatus and methods disclosed herein may introduce a reactive loss in a wireless power system, which may be utilized in tuning such a system for optimal output. The strength of the magnetic field, coupled with the spacing and orientation of the transmission system and receiver system, relative to one another, will cause a certain amount of mutual coupling. With the ability to dynamically alter the inductance of the transmission system, the mutual coupling can be optimized by the systems, apparatus, and methods disclosed herein. Such dynamic tuning of the systems may enable the system to widely maintain an acceptable coupling ("k") between the transmission system and the receiver system, even when the physical distance or orientation between the systems varies dramatically.

In some examples, the system, apparatus and methods disclosed herein may dynamically tune a transmission system to enable different values of inductance and, thus, an increase or decrease in the magnetic field generated by the transmission system.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
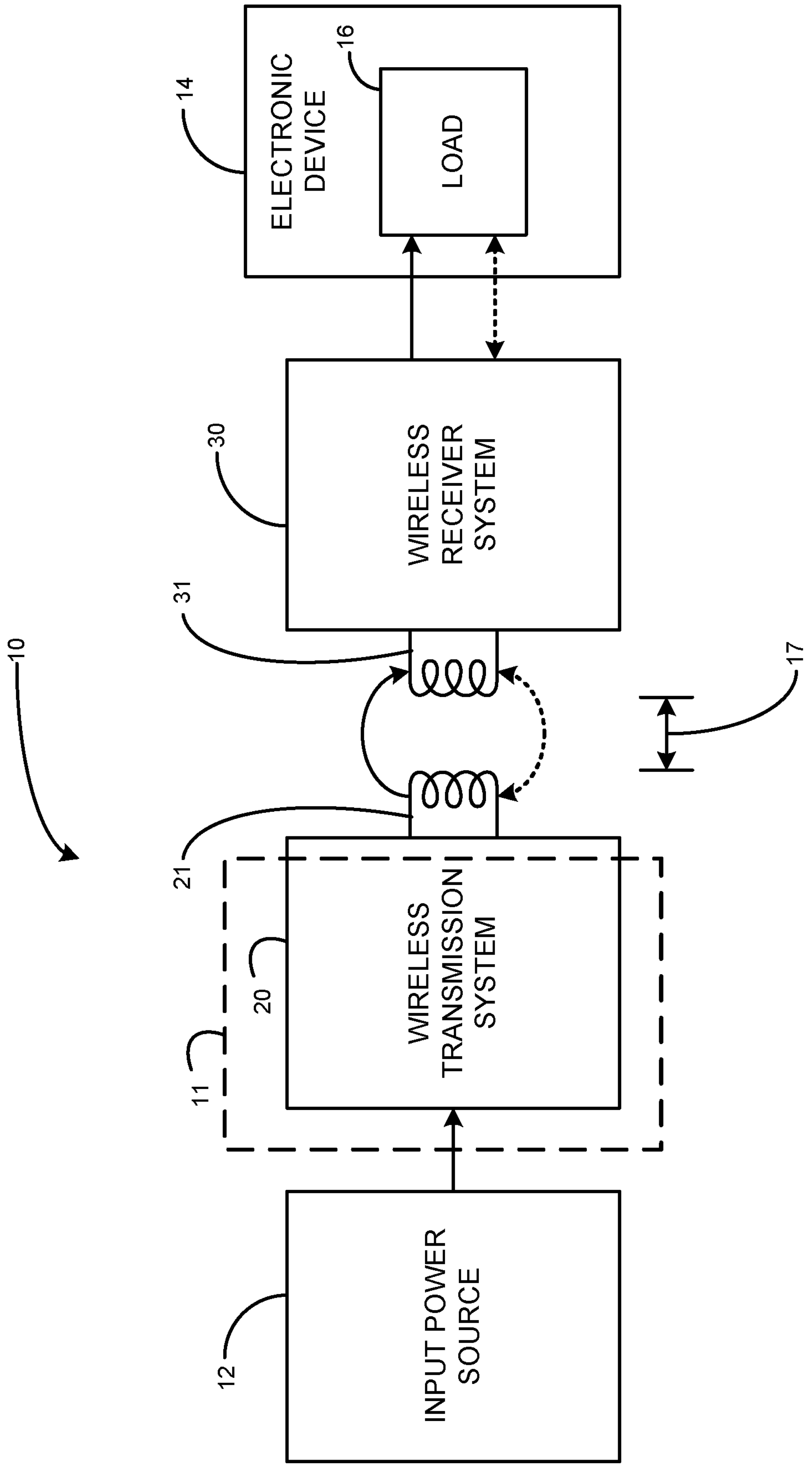
FIG. 1 is a block diagram of an embodiment of a system for wirelessly transferring one or more of electrical energy, electrical power, electromagnetic energy electronic data, and combinations thereof, in accordance with the present disclosure.

Referring now to the drawings and with specific reference to FIG. 1, a wireless electrical connection system 10 is illustrated. The wireless electrical connection system 10 provides for the wireless transmission of electrical signals, such as, but not limited to, electrical energy, electrical power, electromagnetic energy, and electronically transmittable data ("electronic data"). Specifically, the wireless electrical connection system 10 provides for the wireless transmission of electrical signals via near field magnetic coupling. As shown in the embodiment of FIG. 1, the wireless electrical connection system 10 includes a wireless transmission system 20 and a wireless receiver system 30. The wireless receiver system is configured to receive electrical energy, electrical power, electromagnetic energy, and/or electronic data from, at least, the wireless transmission system 20.

As illustrated, the wireless transmission system 20 and wireless receiver system 30 may be configured to transmit electrical energy, electrical power, electromagnetic energy, and/or electronically transmittable data across, at least, a separation distance or gap 17. Thus, the combination of the wireless transmission system 20 and the wireless receiver system 30 create an electrical connection without the need for a physical connection. "Electrical connection," as defined herein, refers to any facilitation of a transfer of an electrical current, voltage, and/or power from a first location, device, component, and/or source to a second location, device, component, and/or destination. To that end, an "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless electrical connection, such as, but not limited to, magnetic, electromagnetic, resonant, and/or inductive field, among other wireless electrical connections, connecting a first location, device, component, and/or source to a second location, device, component, and/or destination.

Alternatively, the gap 17 may be referenced as a "Z-Distance," because, if one considers an antenna 21, 31 to be disposed substantially along a common X-Y plane, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

To that end, the wireless power system 10 operates when the wireless transmission system 20 and the wireless receiver system 30 are coupled. As defined herein, the terms "couples," "coupled," and "coupling" generally refers to magnetic field coupling, which occurs when the energy of a transmitter and/or any components thereof and the energy of a receiver and/or any components thereof are coupled to each other through a magnetic field. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, the wireless transmission system 20 may be associated with a host device 11, which may receive power from an input power source 12. The host device 11 may be any electrically operated device, circuit board, electronic assembly, dedicated charging device, or any other contemplated electronic device. Example host devices 11, with which the wireless transmission system 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

As illustrated, one or both of the wireless transmission system 20 and the host device 11 are operatively associated with an input power source 12. The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

Electrical energy received by the wireless transmission system 20 is then used for at least two purposes: providing electrical power to internal components of the wireless transmission system 20 and providing electrical power to the transmission antenna 21. The transmission antenna 21 is configured to wirelessly transmit the electrical signals conditioned and modified for wireless transmission by the wireless transmission system 20 via near-field magnetic coupling (NFMC). Near-field magnetic coupling enables the transfer of electrical energy, electrical power, electromagnetic energy, and/or electronically transmissible data wirelessly through magnetic induction between the transmission antenna 21 and a receiving antenna 31 of, or associated with, the wireless receiver system 30. Accordingly, near-field magnetic coupling may enable "inductive coupling," which, as defined herein, is a wireless power transmission technique that utilizes an alternating electromagnetic field to transfer electrical energy between two antennas. Accordingly, such inductive coupling is the near field wireless transmission of electrical energy between two magnetically coupled coils that are tuned to resonate at a similar frequency. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmission antenna 21 or the receiver antenna 31 are strategically positioned to facilitate reception and/or transmission of wirelessly transferred electrical energy, power, electromagnetic energy and/or data through near field magnetic induction. Antenna operating frequencies may comprise all operating frequency ranges, examples of which may include, but are not limited to, about 110 kilohertz (kHz) to about 205 kHz (Qi interface standard), 100 kHz to about 350 kHz (PMA interface standard), 6.78 megahertz (MHz) (Rezence interface standard and/or any other proprietary interface standard operating at a frequency of 6.78 MHz), 13.56 MHz (Near Field Communications (NFC) standard, defined by ISO/IEC standard 18092), 27 MHz and/or, alternatively, at an operating frequency of another proprietary operating mode. To that end, the operating frequencies of the antennas 21, 31 may be operating frequencies designated by the International Telecommunications Union (ITU) in the Industrial, Scientific, and Medical (ISM) frequency bands, which include, but is not limited to including, 6.78 MHz, 13.56 MHz, and 27 MHz, which are designated for use in wireless power transfer. In addition, the transmitting antenna and/or the receiving antenna of the present disclosure may be designed to transmit or receive, respectively, over a wide range of operating frequencies on the order of about 1 kHz to about 1 gigahertz (GHz) or greater, in addition to the Qi, PMA, Rezence, and NFC interface standards. In addition, the transmitting antenna and the receiving antenna of the present disclosure may be configured to transmit and/or receive electrical power having a magnitude that ranges from about 10 milliwatts (mW) to about 500 Watts (W). In one or more embodiments the inductor coil of the transmission antenna 21 is configured to resonate at a transmitting antenna resonant frequency or within a transmitting antenna resonant frequency band. As known to those skilled in the art, a "resonant frequency" or "resonant frequency band" refers a frequency or frequencies wherein amplitude response of the antenna is at a relative maximum, or, additionally or alternatively, the frequency or frequency band where the magnitude of the capacitive reactance is substantially similar to the magnitude of the inductive reactance. In one or more embodiments the transmitting antenna resonant frequency is at least 1 kHz. In one or more embodiments the transmitting antenna resonant frequency band extends from about 1 kHz to about 100 MHz. In one or more embodiments the inductor coil of the receiving antenna 31 is configured to resonate at a receiving antenna resonant frequency or within a receiving antenna resonant frequency band. In one or more embodiments the receiving antenna resonant frequency is at least 1 kHz. In one or more embodiments the receiving antenna resonant frequency band extends from about 1 kHz to about 100 MHz.

The wireless receiver system 30 may be associated with at least one electronic device 14, wherein the electronic device 14 may be any device that requires electrical power for any function and/or for power storage (e.g., via a battery and/or capacitor). Additionally or alternatively, the electronic device 14 may be any device capable of receipt of electronically transmissible data. For example, the device may be, but is not limited to being, a handheld computing device, a mobile device, a portable appliance, an integrated circuit, an identifiable tag, a kitchen utility device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless electrical connection, in the form of power signals that are, ultimately, utilized in wireless power transmission from the wireless transmission system 20 to the wireless receiver system 30. Further, dotted lines are utilized to illustrate electronically transmittable data signals, which ultimately may be wirelessly transmitted from the wireless transmission system 20 to the wireless receiver system 30. While the systems and methods herein illustrate the transmission of wirelessly transmitted energy, wirelessly transmitted power, wirelessly transmitted electromagnetic energy, and electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 2:
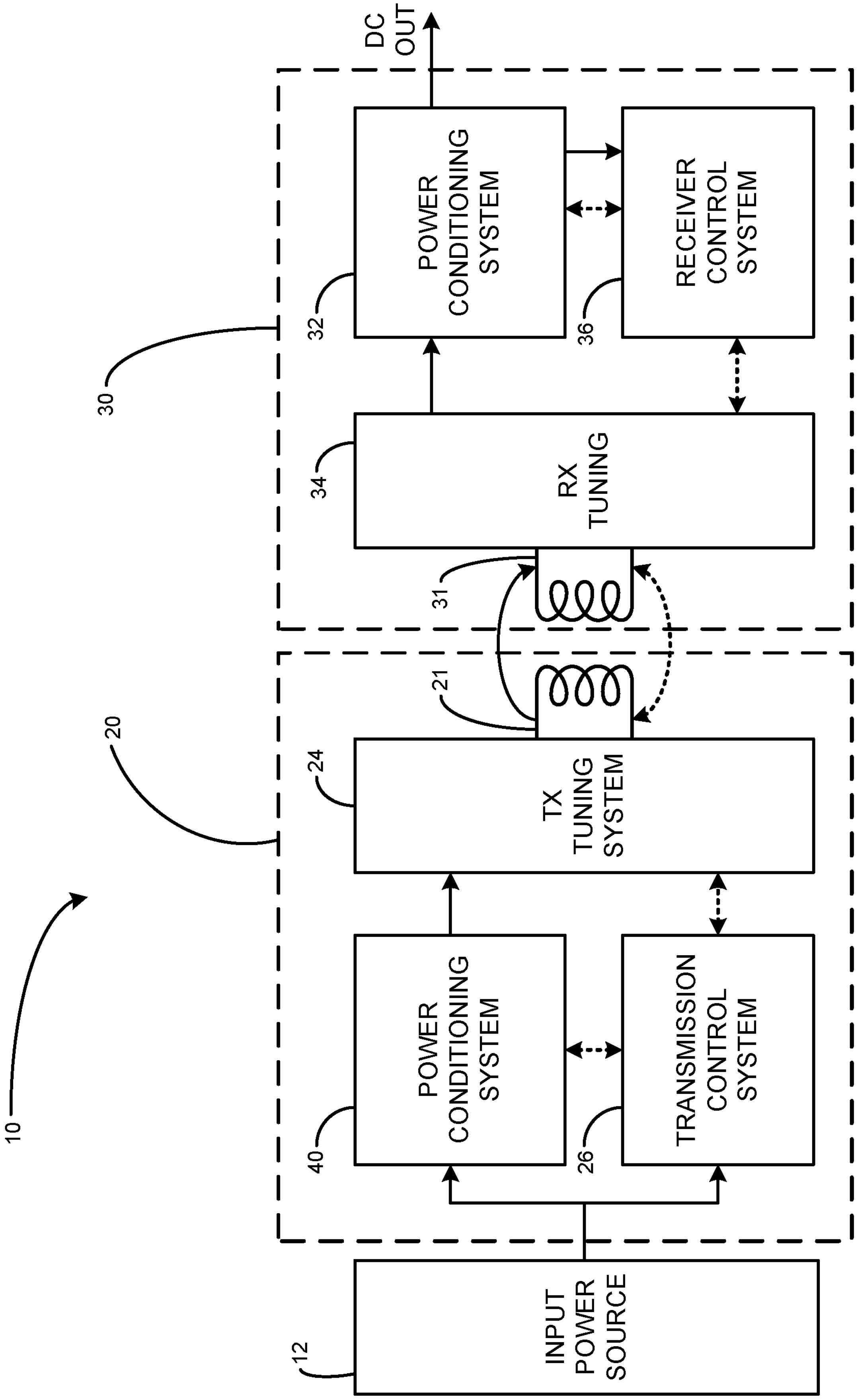
FIG. 2 is a block diagram illustrating components of a wireless transmission system of the system of FIG. 1 and a wireless receiver system of the system of FIG. 1, in accordance with FIG. 1 and the present disclosure.

Turning now to FIG. 2, the wireless connection system 10 is illustrated as a block diagram including example subsystems of both the wireless transmission system 20 and the wireless receiver system 30. As illustrated, the wireless transmission system 20 may include, at least, a power conditioning system 40, a transmission control system 26, a transmission tuning system 24, and the transmission antenna 21. As illustrated, a first portion of the electrical energy input from the input power source 12 is configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antenna 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

Figure 3:
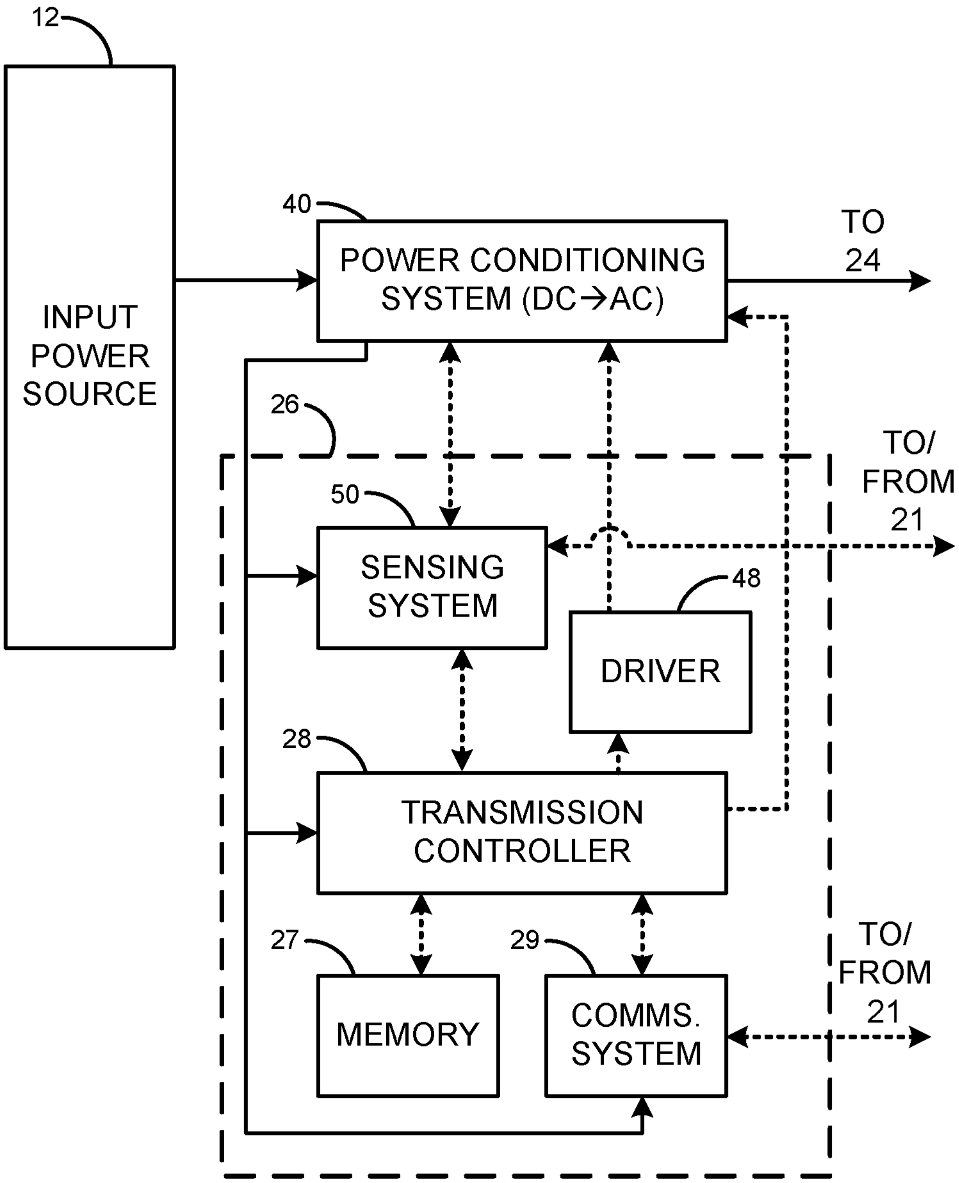
FIG. 3 is a block diagram illustrating components of a transmission control system of the wireless transmission system of FIG. 2, in accordance with FIG. 1, FIG. 2, and the present disclosure.

Referring now to FIG. 3, with continued reference to FIGS. 1 and 2, subcomponents and/or systems of the transmission control system 26 are illustrated. The transmission control system 26 may include, but is not limited to, including a sensing system 50, a transmission controller 28, a communications system 29, a driver 48, and a memory 27. The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20. Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

Further, while particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal.

The sensing system may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmission antenna 21, the receiver antenna 31, along with any other components and/or subcomponents thereof.

Figure 4:
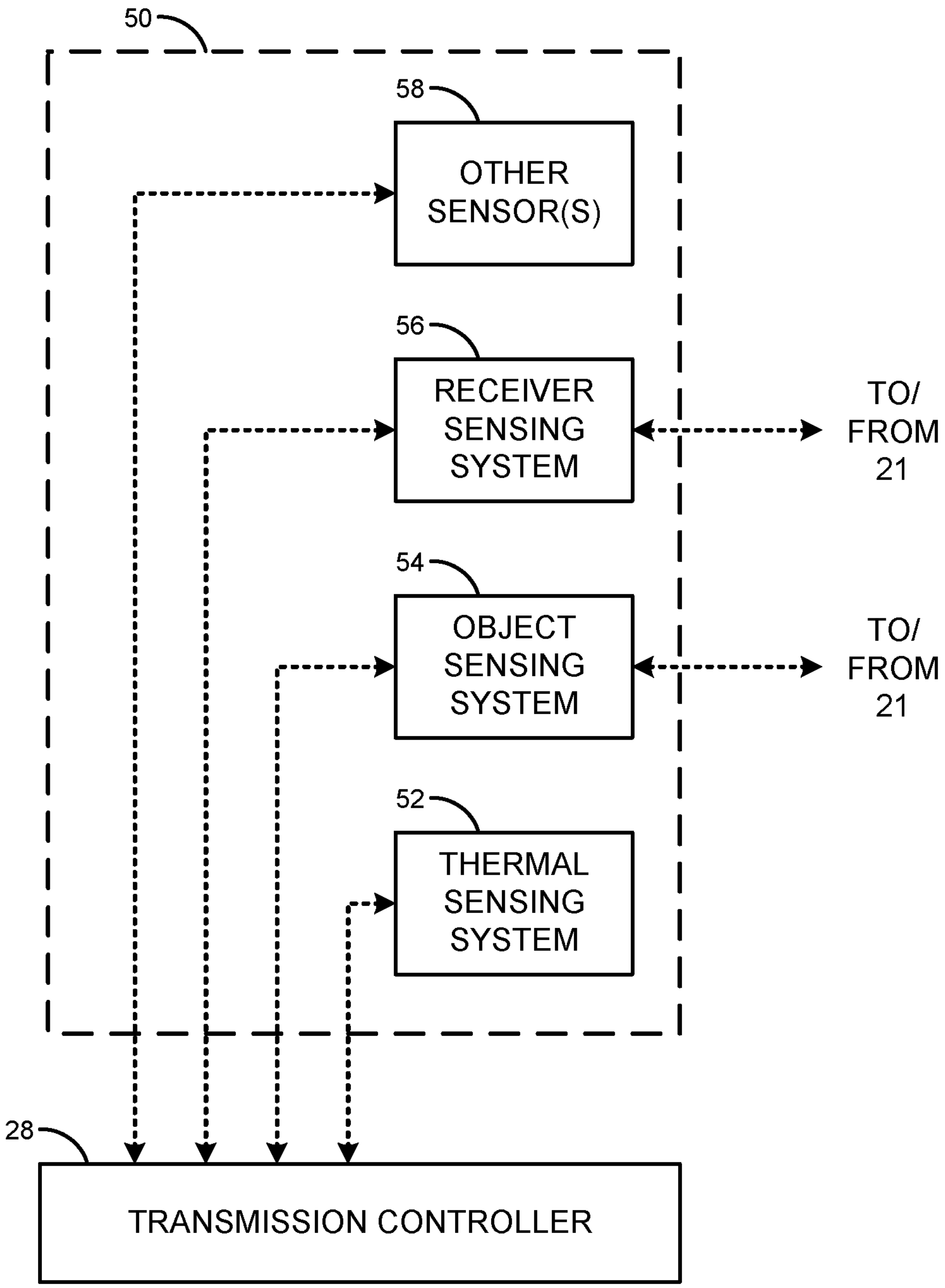
FIG. 4 is a block diagram illustrating components of a sensing system of the transmission control system of FIG. 3, in accordance with FIGS. 1-3 and the present disclosure.

As illustrated in the embodiment of FIG. 4, the sensing system 50 may include, but is not limited to including, a thermal sensing system 52, an object sensing system 54, a receiver sensing system 56, and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may further be a foreign object detection (FOD) system. Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 200 Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmission antenna 21 against a known, acceptable electrical impedance value or range of electrical impedance values. Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the wireless transmission system 20. In some examples, if the presence of any such wireless receiving system is detected, wireless transmission of electrical energy, electrical power, electromagnetic energy, and/or data by the wireless transmission system 20 to said wireless receiving system is enabled. Further, in some examples, if the presence of a wireless receiver system is not detected, wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

Figure 5:
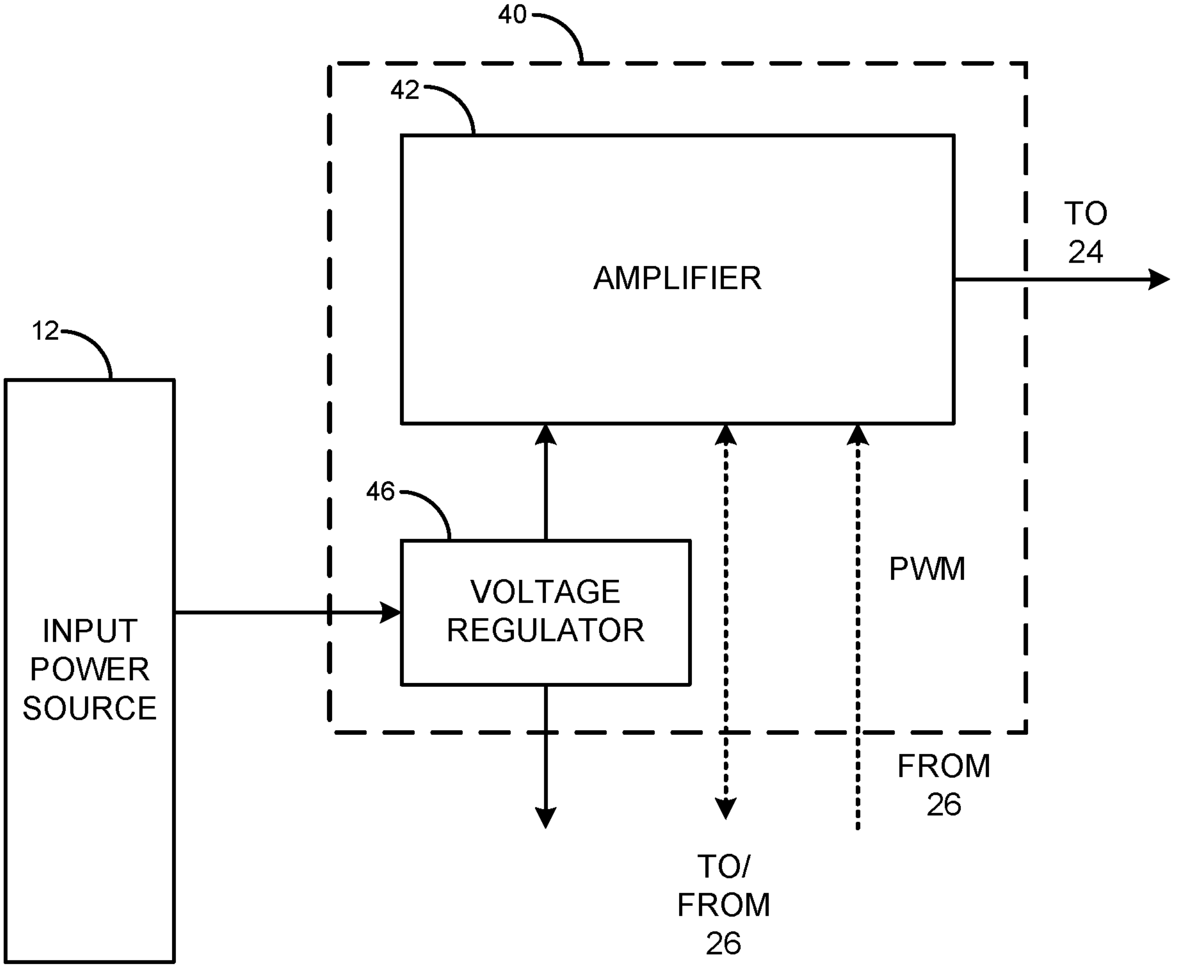
FIG. 5 is a block diagram illustrating components of a power conditioning system of the wireless transmission system of FIG. 2, in accordance with FIG. 1, FIG. 2, and the present disclosure.

Referring now to FIG. 5, and with continued reference to FIGS. 1-4, a block diagram illustrating a first embodiment of the power conditioning system 40 is illustrated. At the power conditioning system 40, electrical power is received, generally, as a direct current (DC) power source, via the input power source 12 itself or an intervening power converter, converting an AC source to a DC source (not shown). A voltage regulator 46 receives the electrical power from the input power source 12 and is configured to provide electrical power for transmission by the antenna 21 and provide electrical power for powering components of the wireless transmission system 20. Accordingly, the voltage regulator 46 is configured to convert the received electrical power into at least two electrical power signals, each at a proper voltage for operation of the respective downstream components: a first electrical power signal to electrically power any components of the wireless transmission system 20 and a second portion conditioned and modified for wireless transmission to the wireless receiver system 30. As illustrated in FIG. 3, such a first portion is transmitted to, at least, the sensing system 50, the transmission controller 28, and the communications system 29; however, the first portion is not limited to transmission to just these components and can be transmitted to any electrical components of the wireless transmission system 20.

The second portion of the electrical power is provided to an amplifier 42 of the power conditioning system 40, which is configured to condition the electrical power for wireless transmission by the antenna 21. The amplifier may function as an invertor, which receives an input DC power signal from the voltage regulator 46 and generates an alternating current (AC) as output, based, at least in part, on PWM input from the transmission control system 26. To that end, the amplifier 42 may be or include, for example, a power stage inverter, such as a dual field effect transistor power stage invertor. The use of the amplifier 42 within the power conditioning system 40 and, in turn, the wireless transmission system 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 mW to about 500 W.

In some non-limiting examples, the amplifier 42 may be or may include one or more class-E power amplifiers. Class-E power amplifiers are efficiently tuned switching power amplifiers designed for use at high frequencies (e.g., frequencies from about 1 MHz to about 1 GHz). Generally, a class-E amplifier employs a single-pole switching element and a tuned reactive network between the switch and an output load (e.g., the antenna 21). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42 is certainly not limited to being a class-E power amplifier and may be or may include one or more of a class D amplifier, a class EF amplifier, an H invertor amplifier, among other amplifiers that could be included as part of the amplifier 42.

Returning now to FIG. 2, the conditioned signal(s) from the power conditioning system 40 is then received by the transmission tuning system 24, prior to transmission by the antenna. The transmission tuning system 24 may include any tuning, impedance matching, filters (e.g. a low pass filter, a high pass filter, a "pi" or "Π" filter, a "T" filter, an "L" filter, a "LL" filter, an L-C trap filter, among other filters), network matching, sensing, and/or conditioning elements configured to optimize wireless transfer of signals from the wireless transmission system 20 to the wireless receiver system 30. For example, the transmission tuning system 24 may include a filter 60, such as the illustrated low pass filter comprised of $L_F$ and $C_F$. Further, the transmission tuning system 24 may include an impedance matching circuit, which is designed to match impedance with a corresponding wireless receiver system 30 for given power, current, and/or voltage requirements for wireless transmission of one or more of electrical energy, electrical power, electromagnetic energy, and electronic data.

Figure 6:
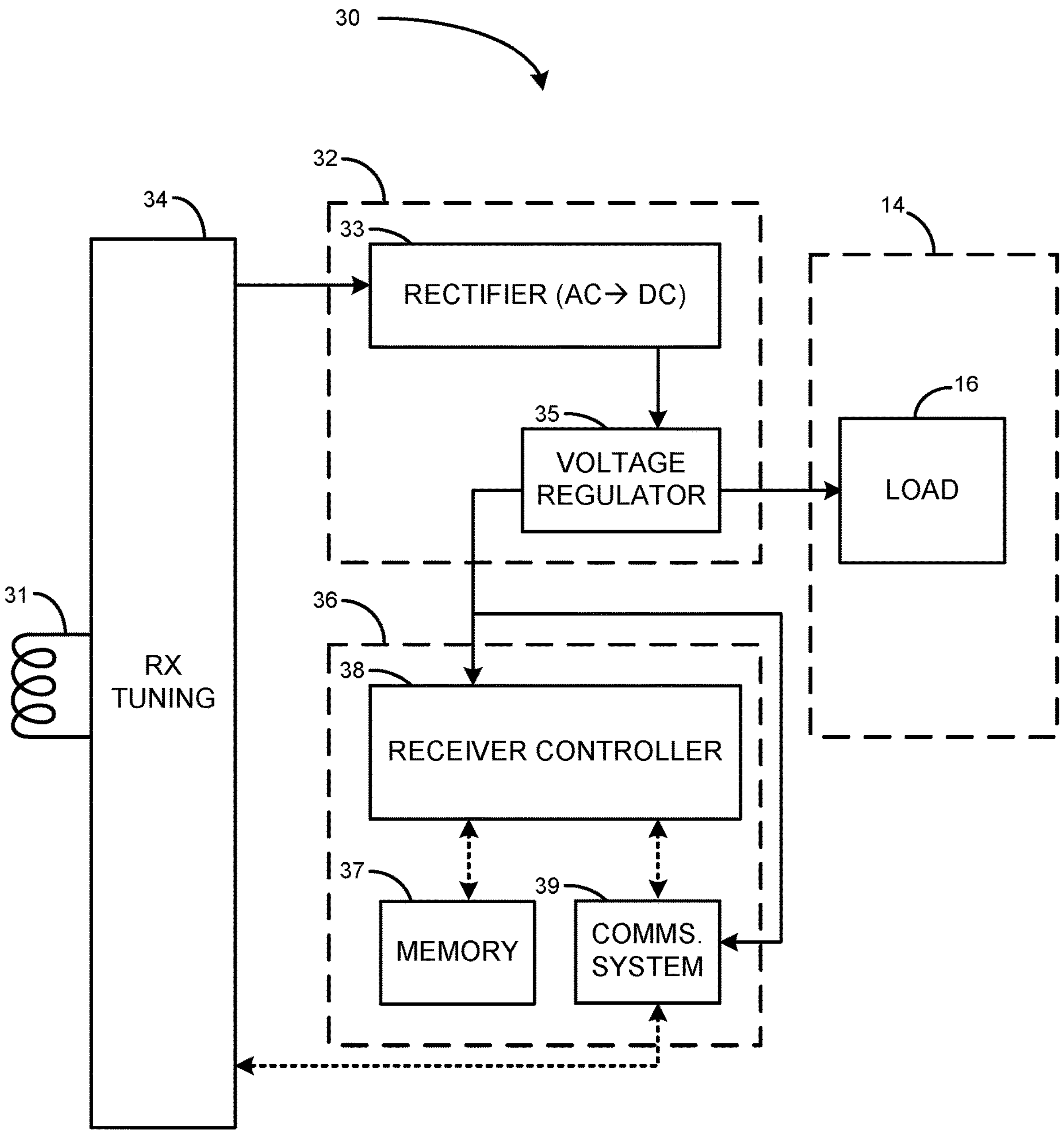
FIG. 6 is a block diagram illustrating components of a receiver control system and a receiver power conditioning system of the wireless receiver system of FIG. 2, in accordance with FIG. 1, FIG. 2, and the present disclosure.

Turning now to FIG. 6 and with continued reference to, at least, FIGS. 1 and 2, the wireless receiver system 30 is illustrated in further detail. The wireless receiver system 30 is configured to receive, at least, electrical energy, electrical power, electromagnetic energy, and/or electrically transmittable data via near field magnetic coupling from the wireless transmission system 20, via the transmission antenna 21. As best illustrated in FIG. 6, the wireless receiver system 30 includes, at least, the receiver antenna 31, a receiver tuning system 34, a power conditioning system 32, and a receiver control system 36. The receiver tuning system 34 may be configured to substantially match the electrical impedance of the wireless transmission system 20. In some examples, the receiver tuning system 34 may be configured to dynamically adjust and substantially match the electrical impedance of the receiver antenna 31 to a characteristic impedance of the power generator or the load at a driving frequency of the transmission antenna 21.

As illustrated, the power conditioning system 32 includes a rectifier 33 and a voltage regulator 35. In some examples, the rectifier 33 is in electrical connection with the receiver tuning system 34. The rectifier 33 is configured to modify the received electrical energy from an alternating current electrical energy signal to a direct current electrical energy signal. In some examples, the rectifier 33 is comprised of at least one diode. Some non-limiting example configurations for the rectifier 33 include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a controlled rectifier, an uncontrolled rectifier, and a half controlled rectifier. As electronic devices may be sensitive to voltage, additional protection of the electronic device may be provided by clipper circuits or devices. The rectifier 33 may further include a clipper circuit or a clipper device. A clipper is herein defined as a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Some non-limiting examples of a voltage regulator 35 include, but are not limited to, including a series linear voltage regulator, a shunt linear voltage regulator, a step up switching voltage regulator, a step down switching voltage regulator, an inverter voltage regulator, a Zener controlled transistor series voltage regulator, and an emitter follower voltage regulator. The voltage regulator 35 may further include a voltage multiplier. A voltage multiplier is herein defined as an electronic circuit or device that delivers an output voltage having an amplitude (peak value) that is two, three, or more times greater than the amplitude (peak value) of the input voltage. The voltage regulator 35 is in electrical connection with the rectifier 33 and configured to adjust the amplitude of the electrical voltage of the wirelessly received electrical energy signal, after conversion to AC by the rectifier 33. In some examples, the voltage regulator 35 may be a low dropout linear voltage regulator; however, other voltage regulation circuits and/or systems are contemplated. As illustrated, the direct current electrical energy signal output by the voltage regulator 35 is received at the load 16 of the electronic device 14. In some examples, a portion of the direct current electrical power signal may be utilized to power the receiver control system 36 and any components thereof; however, it is certainly possible that the receiver control system 36, and any components thereof, may be powered and/or receive signals from the load 16 and/or other components of the electronic device 14.

The receiver control system 36 may include, but is not limited to, including a receiver controller 38, a communications system 39, and a memory 37. The receiver controller 38 may be any electronic controller or computing system that includes, at least, a processor which performs operations, executes control algorithms, stores data, retrieves data, gathers data, controls and/or provides communication with other components and/or subsystems associated with the wireless receiver system 30, and/or performs any other computing or controlling task desired. The receiver controller 38 may be a single controller or may include more than one controller disposed to control various functions and/or features of the wireless receiver system 30. Functionality of the receiver controller 38 may be implemented in hardware and/or software and may rely on one or more data maps relating to the operation of the wireless receiver system 30. To that end, the receiver controller 38 may be operatively associated with the memory 37. The memory may include one or both of internal memory, external memory, and/or remote memory (e.g., a database and/or server operatively connected to the receiver controller 38 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory computer readable memory media.

Further, while particular elements of the receiver control system 36 are illustrated as independent components and/or circuits (e.g., the memory 37, the communications system 39, among other contemplated elements) of the receiver control system 36, such components may be integrated with the receiver controller 38. In some examples, the receiver controller 38 may be and/or include one or more integrated circuits configured to include functional elements of one or both of the receiver controller 38 and the wireless receiver system 30, generally. “Integrated circuits,” as defined herein, generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the communications system 39 may be a dedicated circuit configured to send and receive data at a given operating frequency. For example, the communications system 39 may be a tagging or identifier integrated circuit, such as, but not limited to, an NFC tag and/or labelling integrated circuit. Examples of such NFC tag and/or labelling integrated circuits include the NTAG® family of integrated circuits manufactured by NXP Semiconductors N.V. Additionally or alternatively, the communications system 39 may include Bluetooth® communications components, WiFi communications components, TransferJet™ communications components, among other contemplated out of band communications components. However, the communications system 39 is certainly not limited to these example components and, in some examples, the communications system 39 may be implemented with another integrated circuit (e.g., integrated with the receiver controller 38), may be another transceiver of or operatively associated with one or both of the electronic device 14 and the wireless receiver system 30, among other contemplated communication systems and/or apparatus. Further, in some examples, functions of the communications system 39 may be integrated with the receiver controller 38, such that the controller modifies the inductive field between the antennas 21, 31 to communicate in the frequency band of wireless power transfer operating frequency.

Figure 7:
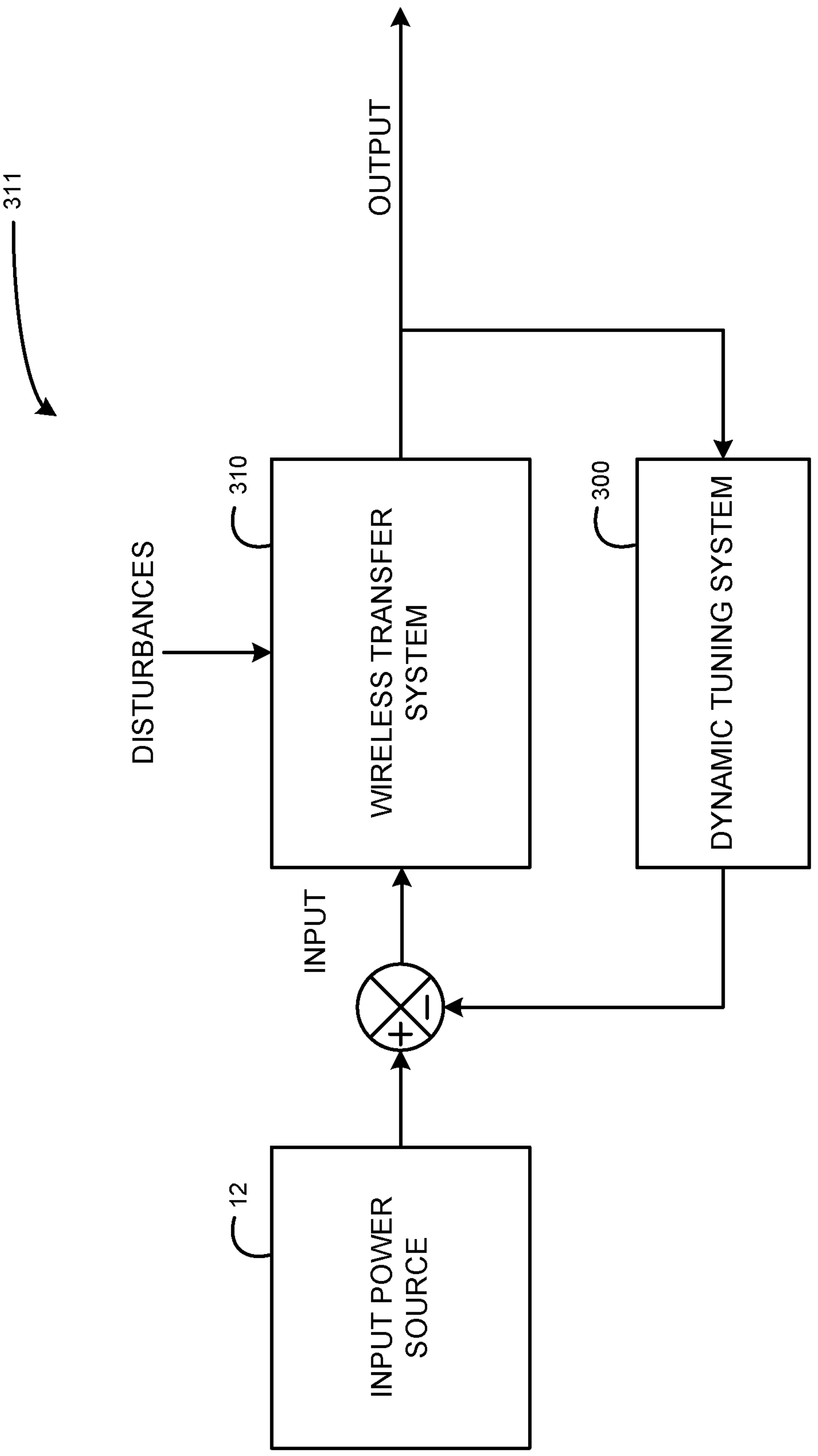
FIG. 7 is a block diagram for a closed loop control system for use with a wireless power transfer system, such as those illustrated in FIGS. 1-6, in accordance with FIGS. 1-6 and the present disclosure.

Turning now to FIG. 7, a simplified block diagram of closed loop system 311 for controlling or otherwise altering a system 310, for wirelessly transferring one or both of electrical energy, electromagnetic energy, electric power, electronic data, and any combinations thereof, is shown. The closed loop system 311 utilizes a dynamic tuning system 300. In the closed loop system 311, one or more disturbances may occur that cause an irregularity within the system 310. The dynamic tuning system 300 has the ability to sense the output and/or operating characteristics of the system 310 and then utilizes tuning mechanisms to nullify the disturbances, as they occur. By nullifying such disturbances, the dynamic tuning system 300 may modify characteristics of the system 310 to correct for the external disturbances.

As will be discussed in more detail below, with reference to FIG. 8, the dynamic tuning system includes one or more sensors that can detect when the output of the system 310, or any characteristics of the system 310, are disturbed. Then, information from the sensors may be fed back to the input of the system 310. The feedback can then change parameters of the system 310 to correct for deviations from desired operating conditions, such deviations being caused by the disturbances. Applying such control theory to systems for wireless transfer of electrical energy and/or electronic data allows the system 10 to adapt to a wide range of external conditions. To that end, the dynamic tuning system 300, as will be described in more detail below, may include one or more sensors and utilize data from such sensors to control forward gain elements, configured to allow for correcting of a wide and dynamic range of external disturbances.

The dynamically tuned system 310, which, in practice, may include the dynamic tuning system 300 may best be understood to include a list of elements that comprise the operating functionality of the closed loop system 311. These elements include, system input, open loop gain elements, feedback sensors, and the system output. Further, a dynamically tuned system will experience external forces that can perturb the system, called external disturbances.

The system input of the closed loop system 311 is the initial input condition of the system, which is established at the starting input to the system 310 and will establish an initial output at a receiver load. In the context of the system 310, an example of the system input is an alternating current frequency and amplitude. Such an initial input will generate a transmission current ($I_{Tx}$). As discussed herein with respect to inductive coupling, $I_{Tx}$ will flow through a transmitter antenna (e.g., transmission antenna 321), creating a magnetic field that will transfer electrical energy and/or electronic data over to the receiver load.

Forward loop gain elements in the closed loop system 311 can be used to make changes to the gain of the forward loop, thus modifying performance of the system 310. These parameters can be varied in some ways to modify the overall gain of the closed loop system 311. When considered in conjunction with sensors from a feedback loop, forward gain elements can alter the overall system output, correcting for unwanted disturbances in the system 310. Forward gain elements, characteristics, and/or conditions in the system for wireless transfer of electrical energy and/or electrical data may include, but are not limited to including, system frequency, duty cycle of the system frequency, supply voltage to a power conditioning system, transmission coil capacitive tuning, transmission coil inductance, transmission coil permeable material, receiver coil permeable material, receiver coil inductance, receiver coil capacitive tuning, receiver rectifier topology, receiver boost converter voltage, among many other contemplated forward gain elements, characteristics, and/or conditions in the system 310.

The term "sensor" is used in its broadest interpretation to define one or more sensors and/or related components that may be associated with the system 310 and that may operate to sense functions, operations, and/or operating characteristics of the system 310. To that end, while sensors disclosed herein are depicted as independent devices and/or processes of the system 310, it is certainly contemplated that such sensors may be embodied by a function of already existing components that sense events and/or disturbances and collect information for use (e.g., a controller analyzing characteristics of input from an antenna and collecting disturbance information therefrom, among other examples). In the context of control loops, such sensors are utilized as detection devices to monitor system performance by detecting external disturbances, wherein such disturbances can be fed back to a system controller to correct for unwanted changes in system performance. There are many sensors and sensor types that may be utilized in monitoring the system 310, with each sensor type detecting one or more types of system parameters that are relevant to overall system operation. Such sensors include, but are not limited to including, voltage sensors monitoring amplifier voltage, current sensors monitoring power amplifier current levels, temperature sensors for measuring temperature at a transmission antenna, temperature sensors for measuring temperature at a receiver antenna, temperature sensors for measuring temperature of hardware in a receiver and/or transmission system, voltage sensors for monitoring voltage at a rectifier, temperature sensors for measuring temperatures at a load of the receiver, a combination of voltage and/or current sensors sensing a load voltage-to-current ratio, power indicators for determining unaccounted-for power (e.g., power sent to receiver versus power received by receiver), and ambient temperature sensors, among other contemplated sensors.

The system output for the system 310, generally, is the intended final target outcome of the system 310. For example, in the context of wireless power transfer, the system output of the system 310 may be the voltage, current, and/or power output delivered to the load of a receiver system of the system 310. In view of the closed loop system 311, the system output is determined by an input (e.g., an input power source) and the forward gain elements of the system 310. Accordingly, such forward gain elements may be modified by the feedback from the dynamic tuning system 300 to drive the output to the desired output.

As discussed above, external disturbances may be any unwanted divergence in the output of the system 310 that can cause a deviation in performance by the system 310, such derivations being divergent from the intended output of the system 310. Such disturbances can be nullified if they are detected by sensors of the dynamic tuning system 300 and the data collected by said sensors is fed back into the input, causing a desired modification to the system 310 and/or parameters of the system 310 to negate the deviation. In the context of wireless power transfer by the system 310, some example disturbances include, but are not limited to including, a change in a gap between transmission antenna and receiver antenna (as discussed above, often referenced as "Z-distance"), antenna-to-antenna orientation change (e.g., in the X-Y dimension, within a common plane of the device whose orientation changes), rise in temperature in a transmission antenna, rise in temperature in a receiver antenna, rise in temperature in electrical components, rise in temperature at a load associated with a receiver, changes in load impedance, changes in power efficiency, detection of foreign objects in signal path, and changes in ambient temperature, among other contemplated disturbances to the system 310.

Figure 8:
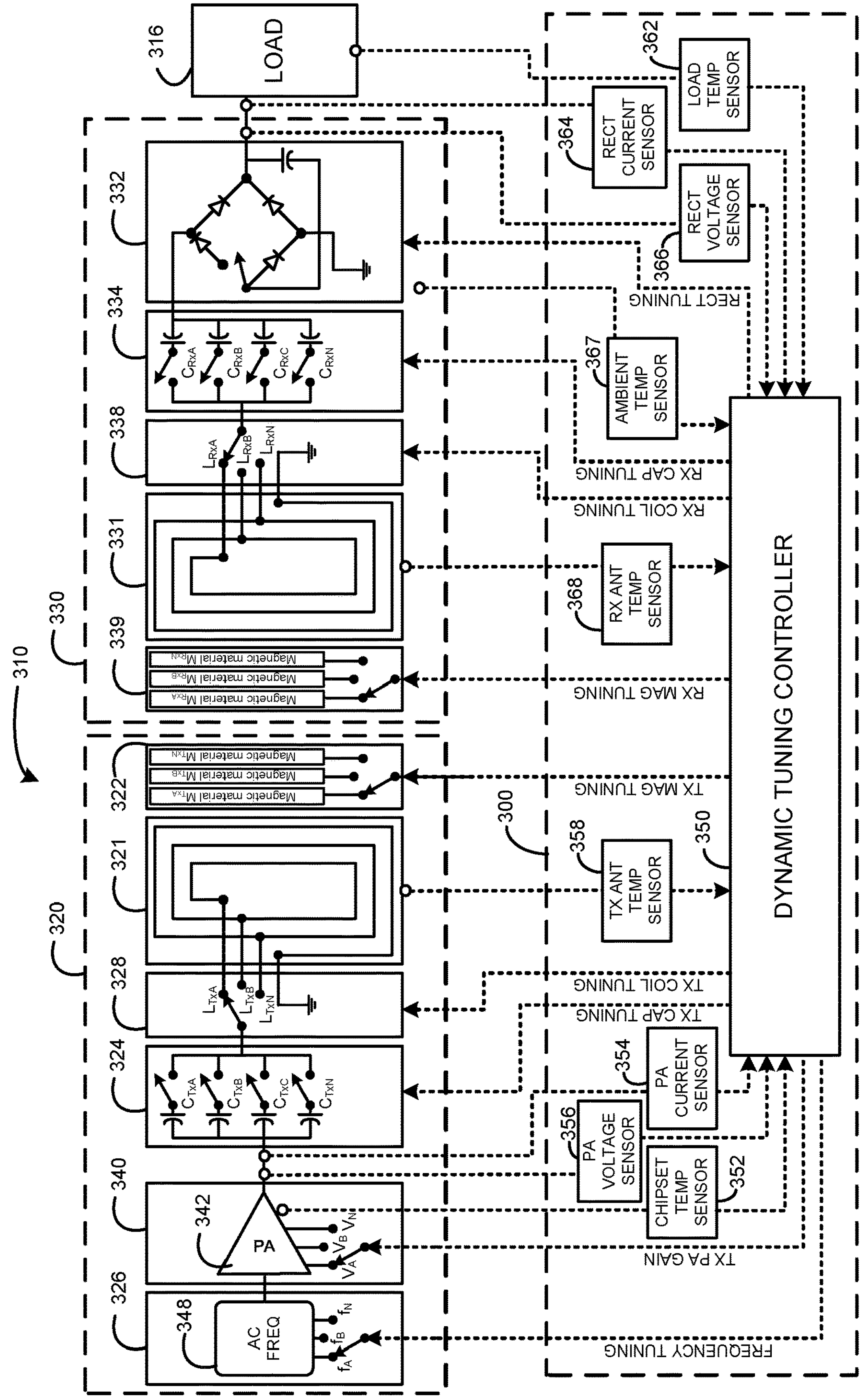
FIG. 8 is a block schematic diagram of another wireless power transfer system, sharing like or common elements to those of FIGS. 1-6, in accordance FIG. 7 and the present disclosure.

Referring now to FIG. 8 and with continued reference to FIG. 7, an exemplary embodiment of the system 310, including the dynamic tuning system 300, is illustrated in greater detail. As indicated by the reference numbers, the system 310 may include substantially similar, identical, and/or analogous elements to those of FIGS. 1-6, as indicated by common reference numbers. Alternatively, functionally comparable components, which perform one or more similar functions to another, earlier described component, but have distinguishing characteristics, are denoted by three-digit numbers, wherein the most significant digit indicates a "series" for the current embodiment and the two least significant digits correspond to the earlier described component. "Functionally corresponds," as defined herein, means that the two or more components perform a similar function within the context of their respective, broader system, method, or apparatus. For example, in describing the system 310, the most significant digit "3" indicates the series, for the embodiment of FIGS. 7 and 8, and the two least significant digits, "10," indicate that the wireless receiver system functionally corresponds to the earlier described system 10.

The system 310 includes a wireless transmission system 320 and a wireless receiver system 330. The wireless transmission system 320 includes a plurality of elements, which, in combination, are capable of generating a magnetic field over a wide dynamic range, when compared to a similar system having fixed components. Such components include, but are not limited to including, a dynamically tunable transmission control system 326, a dynamically tunable power conditioning system 340, a dynamic tuning capacitor circuit 324, a dynamically tunable transmission antenna 321, operatively associated with a mode switch 328 for the transmission antenna 321, and dynamically tunable magnetic materials 322. By allowing one or more of these components to be dynamically tuned, the wireless transmission system 320 is capable of delivering a relatively small magnetic field strength, which would be appropriate for power transfer if the receiver antenna 331 is in close proximity to the transmission antenna 321, while also being capable of transferring a relatively large magnetic field strength, appropriate for wireless power transfer if the receiver antenna 331 is fairly far away from the transmission antenna 321.

In corresponding fashion, the wireless receiver system 330 includes, but is not limited to including dynamically tunable magnetics 339, a dynamically tunable receiver antenna 331, operatively associated with a mode switch 338 for the receiver antenna 331, a dynamic tuning capacitor circuit 334, and a dynamically tunable rectifier 332. The wireless receiver system is capable of being tuned to capture a magnetic field of relatively small magnetic field strength which would be appropriate for power transfer if the receiver antenna 331 is in close proximity to the transmission antenna 321, while also being capable of capturing a relatively large magnetic field strength, appropriate for wireless power transfer if the receiver antenna 331 is further away from the transmission antenna 321.

To establish the ideal input, based on feedback determined from sensors of the dynamic tuning system 300 and detected disturbances in the system 310, the dynamic tuning controller 350 is configured to establish power transfer conditions for the given set of parameters and disturbances. Accordingly, the dynamic tuning controller 350 may execute any methods, processes, algorithms, comparative mapping, and/or any other procedures, to dynamically alter functional characteristics of one or both of the wireless transmission system 320 and the wireless receiver system 330 to achieve a desired output of the system 310.

For example, the dynamic tuning controller 350 may be configured to execute a tuning process to allow for fast convergence to an optimal or, alternatively, sufficient wireless power transfer configuration. The dynamic tuning controller 350 may be any electronic controller or computing system that includes, at least, a processor which performs operations, executes control algorithms, stores data, retrieves data, gathers data, controls and/or provides communication with other components and/or subsystems associated with system 310 and/or the dynamic tuning system 300, and/or the dynamic tuning controller 350 performs any other computing or controlling task desired. The dynamic tuning controller 350 may be a single controller or may include more than one controller disposed to control various functions and/or features of the system 310 and/or the dynamic tuning system 300. For example, functional equivalence of the dynamic tuning controller may be executed by a controller of the transmission control system 326, a controller of the wireless transmission system 320 that is independent of the transmission control system 326, a controller of the wireless receiver system 330, a combination of processes executed by a controller of the transmission control system 326 and a controller of the wireless receiver system 330, a controller external to the system 310 but in operative communication with the system 310, and any combinations thereof.

Functionality of the dynamic tuning controller 350 may be implemented in hardware and/or software and may rely on one or more data maps relating to the operation of the system 310 and/or the dynamic tuning system 300. To that end, the dynamic tuning controller 350 may be operatively associated with a memory. The memory may include one or both of internal memory, external memory, and/or remote memory (e.g., a database and/or server operatively connected to the dynamic tuning controller 350 via a network, such as, but not limited to, the Internet). The internal memory and/or external memory may include, but are not limited to including, one or more of a read only memory (ROM), random access memory (RAM), a portable memory, and the like. Such memory media are examples of nontransitory memory media.

In some examples, the dynamic tuning controller 350 may be configured for dynamically tuning the source frequency for the wirelessly transferable electrical energy. In wireless power transfer, higher frequencies can create higher magnetic fields, due to the steeper slope of the waveform at zero crossing points. Therefore, increasing the frequency can increase the magnetic field strength and, accordingly, the frequency of the output electrical energy, as an AC signal, can be used as a tuning element to optimize the electrical field strength. To that end, the transmission control system 326 may include a frequency selector 348, which may be driven by the dynamic tuning controller 350 to dynamically tune the frequency of the AC electrical energy signal to be output by the wireless transmission system 320. The frequency selector 348 can select the operating frequency of the wireless transmission system 320 from any number of operating frequencies ($f_A$, $f_B$, up to $f_N$, for "n" number of selectable frequencies).

In addition to altering the magnitude of the magnetic field, the electrical energy at its AC frequency is transmitted through various components that contain frequency selective components. Accordingly, at the resonant point of frequency selective components, where the capacitive and inductive components cancel out one another's reactive impedances, only a resistive loss is left to act on the AC frequency electrical energy signal. In some examples, this is normally the desired frequency of operation for maximum wireless power transfer; however, by tuning the AC frequency, using the frequency selector 348 as driven by the dynamic tuning controller 350, a reactive loss is introduced to the system 310, which itself can be used as a tuning element for optimizing system operation.

Turning now to the power conditioning system 340 of the wireless transmission system 320, which includes an amplifier 342. The electrical energy signal, oscillating at the AC frequency, is received and amplified by the amplifier 342 to create the larger current that is then transmitted through the transmission antenna 321. The level of amplification, by the amplifier 342 may be increased and/or decreased, by increasing or decreasing the supply voltage to the power amplifier. The dynamic tuning controller 350 may be configured to alter the supply voltage to the power amplifier, to dynamically alter the output of the amplifier 342. In some examples, the dynamic tuning controller 350 may be operatively associated with a DC-DC buck or boost converter (for example, the voltage regulator 46), wherein the converter reacts to instructions from the dynamic tuning controller to alter the supply voltage of the power amplifier 342.

After amplification at the power conditioning system 340, the electrical energy signal is filtered by the dynamic tuning capacitor circuit 324. The varying of capacitors and/or capacitance by the dynamic tuning capacitor circuit 325, to tune the system 310, can be done either discretely, with a bank of switchable capacitors, or continuously with a device that can tune a capacitance in response to an external voltage. In the non-limiting example of FIG. 8, the dynamic tuning capacitor circuit 324 includes a bank of capacitors (while four are shown, it is contemplated that any number of capacitors may be used, up to "n" number of capacitors). As shown, for "n" number of capacitors, the number of possible switchable states of capacitance will be $n^2$ switchable states (e.g., in the example wherein the bank includes four capacitors, the circuit 324 will have 16 possible switchable states).

Further, as illustrated in FIG. 8, the transmission antenna 321 may be dynamically tuned to enable different values of inductance and, thus, an increase or decrease in the magnetic field generated by the transmission antenna 321. The strength of the magnetic field, coupled with the spacing and orientation of the transmission antenna 321 and receiver antenna 331, relative to one another, will cause a certain amount of mutual coupling. With the ability to dynamically alter the inductance of the transmission antenna 321, the mutual coupling can be optimized by the dynamic tuning system 300. Such dynamic tuning of the transmission antenna 321 may enable the system 310 to widely maintain an acceptable coupling ("k") between the transmission antenna 321 and the receiver antenna 331, even when the physical distance or orientation between the coils varies dramatically.

Additionally, when dynamic tuning of the transmission antenna inductance is combined with capacitive tuning at the dynamic tuning capacitor circuit, reactive elements of the system 310 can be tuned out. The mode switch 328 may be configured to change the mode or number of loop turns that forms the inductor; therefore, when the mode switch 328 has selected the outer most loop (e.g., at $L_{TxA}$, as illustrated) all loops are active and inducing current, whereas if the mode switch chooses the innermost switch (e.g., at $L_{TxN}$, as illustrated), all loop turns radially outward of the selected loop turn are shorted and, thus, not inducing current. Such coil designs may be "multi-mode" antennas or antenna configurations, constructed from a common structure. Non-limiting examples of multi-mode antennas can be found in U.S. Pat. Nos. 9,941,743, 9,960,628, 9,941,743, all to Peralta et al., U.S. Pat. Nos. 9,948,129, 10,063,100 to Singh et al., U.S. Pat. No. 9,941,590 to Luzinski, U.S. Pat. No. 9,960,629 to Rajagopalan et al. and U.S. Patent App. Nos. 2017/0040107, 2017/0040105, 2017/0040688 to Peralta et al., all of which are assigned to the assignee of the present application and incorporated by reference herein. While the mode switch 328 illustrates three modes, it is certainly contemplated that the transmitter antenna 321 and associated mode switch 328 may be configured for any number of modes, up to "n" number of modes (e.g., $L_{TxA}$, $L_{TxB}$, . . . , $L_{TxN}$).

Intensity of the magnetic field strength between the transmission antenna 321 and the receiver antenna 331 may be altered by the presence of permeable material in the vicinity of one or both of the transmission antenna 321 and the receiver antenna 331. Such permeable materials, when situated proximate to one or both of the antennas 321, 331, may have the effect of enhancing magnetic fields produced by the antenna(s) 321, 331 and, thusly, may enhance coupling of the antennas 321, 331, in comparison to coupling in the presence of an air gap or vacuum. Accordingly, the dynamically tunable magnetic materials 322, 339 are included, respectively, proximate to the antennas 321, 331. The dynamically tunable magnetic materials 322, 339 may be any component, mechanism, and/or system for switching any number of magnetic materials proximate to the antenna(s) 321, 331, in response to instructions provided by the dynamic tuning controller 350. For example, the dynamically tunable magnetic materials 322, 339 may be disposed on a rotating mechanical wheel (not shown), wherein the dynamic tuning controller 350 can rotate the wheel to the desired permeable material of the dynamically tunable magnetic materials 322, 339. As illustrated, the dynamically tunable magnetic materials may include any number of magnetic materials, to be selected during dynamic tuning, up to "n" number of magnetic materials (e.g., $M_{TxA}$, $M_{TxB}$, . . . , $M_{TxN}$ and $M_{RxA}$, $M_{RxB}$, . . . , $M_{RxN}$).

Similarly to the dynamic tuning of the transmission antenna 321, the receiver antenna 331 may be dynamically tuned to enable difference values of inductance and, hence, an increase or decrease in the magnetic field magnitude compatibility for the receiver antenna 331. The strength of the magnetic field, coupled with the spacing and orientation of the transmission antenna 321 and receiver antenna 331, relative to one another, will cause a certain amount of mutual coupling. With the ability to dynamically alter the inductance of the receiver antenna 331, the mutual coupling can be optimized by the dynamic tuning system 300. Such dynamic tuning of the receiver antenna 331 may enable the system 310 to widely maintain an acceptable coupling, k, between the transmission antenna 321 and the receiver antenna 331, even as the physical distance or orientation between the coils varies dramatically.

Additionally, when dynamic tuning of the transmission antenna inductance is combined with capacitive tuning at the dynamic tuning capacitor circuit 324, reactive elements of the system 310 can be tuned out. The mode switch 338 may be configured to change the mode or number of loop turns that forms the inductor; therefore, when the mode switch 338 has selected the outer most loop (e.g., at $L_{RxA}$, as illustrated) all loops are active and inducing current, whereas if the mode switch chooses the innermost switch (e.g., at $L_{RxN}$, as illustrated), all loop turns radially outward of the selected loop turn are shorted and, thus, not inducing current. Such coil designs may be "multi-mode" antennas or antenna configurations, constructed from a common structure, as discussed above with reference to the dynamic tuning of the transmission antenna 321. While the mode switch 338 illustrates three modes, it is certainly contemplated that the transmission antenna 321 and associated mode switch 328 may be configured for any number of modes, up to "n" number of modes (e.g., $L_{TxA}$, $L_{TxB}$, . . . , $L_{TxN}$).

After receipt by the receiver antenna 331, the electrical energy signal is filtered by the dynamic tuning capacitor circuit 334. The varying of capacitors and/or capacitance by the dynamic tuning capacitor circuit 334, to tune the system 310, can be done either discretely, with a bank of switchable capacitors, or continuously with a device that can tune a capacitance in response to an external voltage. In the non-limiting example of FIG. 8, the dynamic tuning capacitor circuit 334 includes a bank of capacitors (while four are shown, it is contemplated that any number of capacitors may be used, up to "n" number of capacitors). As shown, for "n" number of capacitors, the number of possible switchable states of capacitance will be $n^2$ switchable states (e.g., in the example wherein the bank includes four capacitors, the circuit 334 will have 16 possible switchable states).

As illustrated in FIG. 8, the rectifier 332 may be dynamically tuned based on final load requirements of the load 316. To that end, the dynamic tuning controller 350 may communicate with the rectifier 332 to switch among modes to optimize system 10 performance for efficiency and/or maximum power. In a non-limiting example, the rectifier may be switched between a half-wave rectifier configuration, where lower power output is needed, but efficiency is desired to be kept at a relative maximum, and a full-wave rectifier configuration, where highest power output is desired in the system.

As illustrated, the dynamic tuning system 300 includes one or more sensors operatively associated with the system 10 and disposed to gather data to, for example, determine the existence of disturbances. To that end, the dynamic tuning system 300 may include one or more electrical sensors, such as, but not limited to, the amplifier voltage current sensor 354 for determining current output of the amplifier 342, an amplifier voltage sensor 356 for determining the voltage at the output of the amplifier 342, a rectifier voltage sensor 366 for determining a voltage at one or both of the input and output of the rectifier 332, and a rectifier current sensor 364 for determining a current at one or both of the input and the output of the rectifier 332. Of course, other electrical sensors at other locations within the system 310 are certainly contemplated for use with the dynamic tuning system 300. Additionally or alternatively, the dynamic tuning system 300 may include one or more temperature sensors operatively associated with the system 310. For example, as shown, the dynamic tuning system 300 may include a chipset temperature sensor 352 for determining a temperature of one or more locations within the hardware of the wireless transmission system 320, a transmission antenna temperature sensor 358 for determining a temperature of one or more locations proximate to the transmission antenna 321, a receiver antenna temperature sensor 368 for determining a temperature of one or more locations proximate to the receiver antenna 331, an ambient temperature sensor 367 for determining a temperature at one or more location within the wireless receiver system 330, and a load temperature sensor 362 for determining a temperature of one or more locations proximate to the load 316.

Data from the temperature sensors 358, 368, 367, 362 may be used to prevent excessive heating within the system 310. Such data is sensed and communicated to the dynamic tuning controller, which can then be used in generating dynamic tuning instructions. Additionally, data gathered by the electrical sensors 354, 356, 364, 366 can be used in generating dynamic tuning systems, by determining losses or lack of transfer within one or both of the wireless transmission system 320 and the wireless receiver system 330. The data gathered by the sensors 352, 354, 356, 358, 362, 364, 366, 368 is utilized by the dynamic tuning controller 350 to determine existence of disturbances, then generate dynamic tuning instructions, to communicate to various components of the system 310 and/or dynamic tuning system 300 to achieve optimal output. As illustrated, outgoing instructions from the dynamic tuning controller 350 may include, but are not limited to including, instructions for frequency tuning at the frequency selector 348, instructions for transmission amplification alteration at the amplifier 342, instructions for transmission capacitor tuning at the dynamic tuning capacitor circuit 324, instructions for transmission coil tuning at the mode switch 328 operatively associated with the transmission antenna 321, instructions for transmission magnetic materials tuning at the dynamically tunable magnetic materials 322, instructions for receiver magnetic materials tuning at the dynamically tunable magnetic materials 339, instructions for receiver antenna tuning at the mode switch 338 operatively associated with the receiver antenna 331, instructions for receiver capacitor tuning at the dynamic tuning capacitor circuit 334, instructions for rectifier tuning at the rectifier 332, among other contemplated instructions for dynamically tuning one or more components of the system 310.

By utilizing the dynamic tuning system 300 with the system 310, myriad tunable outcomes are possible, given operational requirements and/or systemic reactions to disturbances. For example, if the system 310 is configured to operate with a widely varying resistive load, a decreasing resistive load may require a significant increase in power. Accordingly, in such scenarios, the dynamic tuning controller may be configured to first modify the rectifier 332 from a half wave rectifier configuration to a full wave rectifier configuration. While these two examples are shown, it is certainly contemplated that other rectifier types and/or voltage regulation configurations could be utilized and/or switched on and off, when implemented as part of the rectifier 332; such configurations may include, but are not limited to including, a low dropout linear voltage regulator, a series linear voltage regulator, a shunt linear voltage regulator, a step up switching voltage regulator, a step down switching voltage regulator, an inverter voltage regulator, a Zener controlled transistor series voltage regulator, and an emitter follower voltage regulator. Subsequently, this configuration may cause the wireless receiver system 330 to require greater power output from the wireless transmission system 320, which may, then, require higher coupling from the antenna(s) 321, 331. Accordingly, one or more components of the system 310 can be thusly tuned by the dynamic tuning controller 350 to meet these conditions.

In another non-limiting example, consider that the system 310 is configured for wireless power transfer over a myriad of gap widths, or "Z-distances." In such examples, a decreasing magnetic field may first be sensed, by the rectifier voltage sensor 366, as a decrease in the rectification voltage. Such sensed information may then cause the dynamic tuning controller 350 to react and generate instructions to dynamically tune one or more components of the system 310, such that coupling is increased to nullify the disturbance of the decreased rectification voltage.

In another non-limiting example, consider that the load 316 has a maximum operating temperature of 45 degrees Celsius (C). Further, consider that the load temperature sensor and/or ambient temperature sensor 367 determines that a temperature within the wireless receiver system is about 40 degrees C. Thus, the dynamic tuning controller 350 can detect that the system is only 5 degrees C. from being disabled, via, for example, a safety protocol. However, due to the dynamic tuning controller 350 knowing this temperature differential, it can optimize tuning of the system 310 to reduce wireless power transfer to a lower level, in a way that prevents overheating at the wireless receiver system 330.

Figure 9:
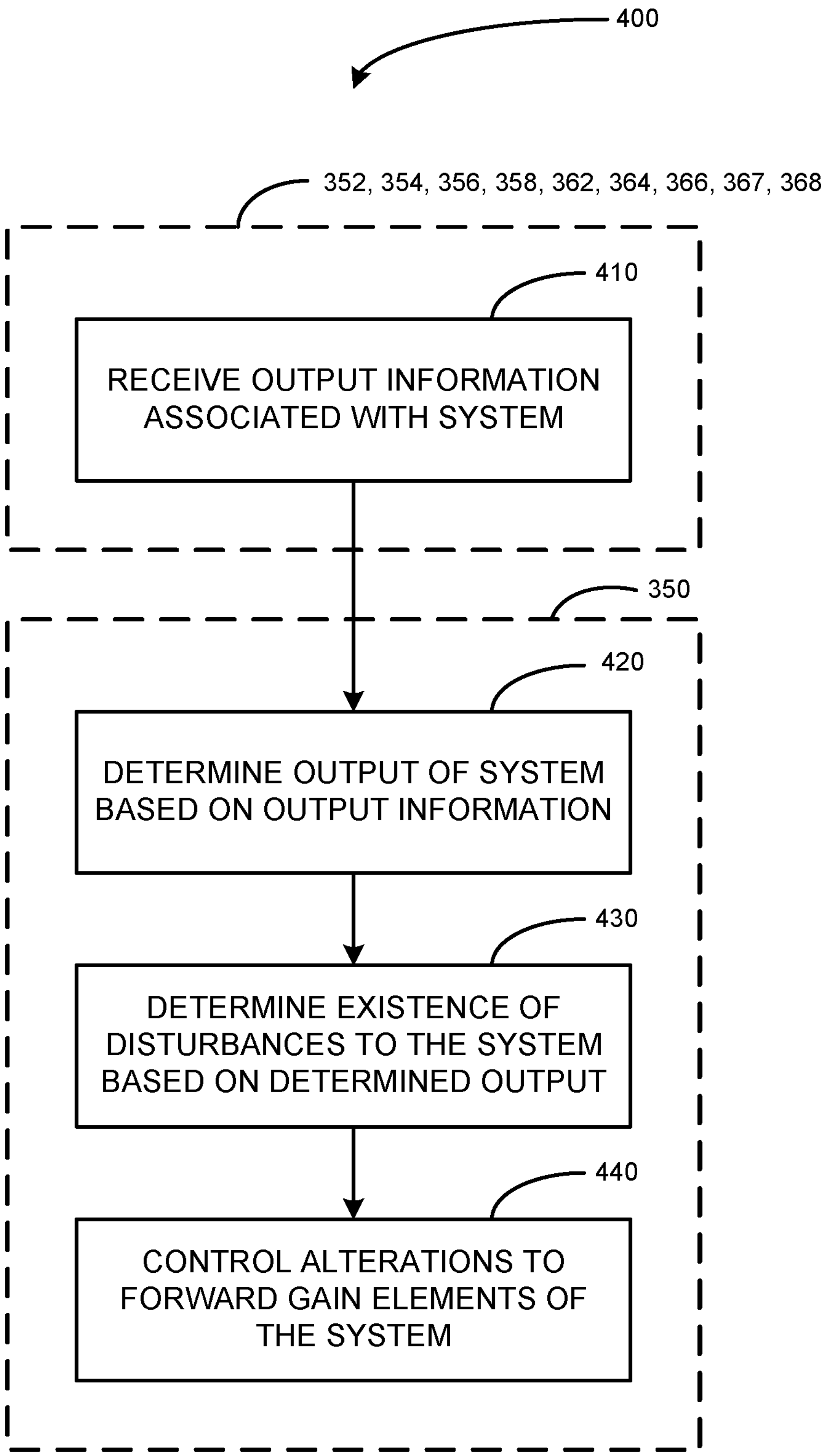
FIG. 9 is a flow chart for an exemplary method for dynamically tuning a wireless power transfer system, in accordance with FIGS. 1-8 and the present disclosure.

Turning now to FIG. 9, a block diagram for method 400 for dynamically tuning the wireless power transfer system 310, utilizing the dynamic tuning system 300, is illustrated. As illustrated, the labeled, dash-lined borders surrounding one or more blocks indicate which components of the dynamic tuning system 300 perform said blocks (e.g., block 420 performed by the dynamic tuning controller 350). Beginning at block 410, the method 400 includes receiving output information associated with one or more of the system 310, the wireless transmission system 320, the wireless receiver system 330, and any combinations thereof, by at least one of the sensor(s) 352, 354, 356, 358, 362, 364, 366, 367, 368. At block 420, the dynamic tuning controller 350 determines an output of one or more of the system 310, the wireless transmission system 320, the wireless receiver system 330, and any combinations thereof, based on the output information. Such output may include, but is not limited to, outputs discussed above with respect to FIG. 8. Further, the method 400 includes determining, by the dynamic tuning controller 350, existence of one or more disturbances to one or more of one or more of the system 310, the wireless transmission system 320, the wireless receiver system 330, and any combinations thereof, based on the output. Such disturbances may include, but are not limited to including, any disturbances discussed above with respect to FIG. 8. Further, the method 400 includes controlling alterations to one or more forward gain elements of one or more of the system 310, the wireless transmission system 320, the wireless receiver system 330, and any combinations thereof, based on the output. Such forward gain elements may include, but are not limited to including, any disturbances discussed above with respect to FIG. 8. Additionally, such alterations may include, but are not limited to including, any alterations discussed above with respect to FIG. 8.

Figure 10:
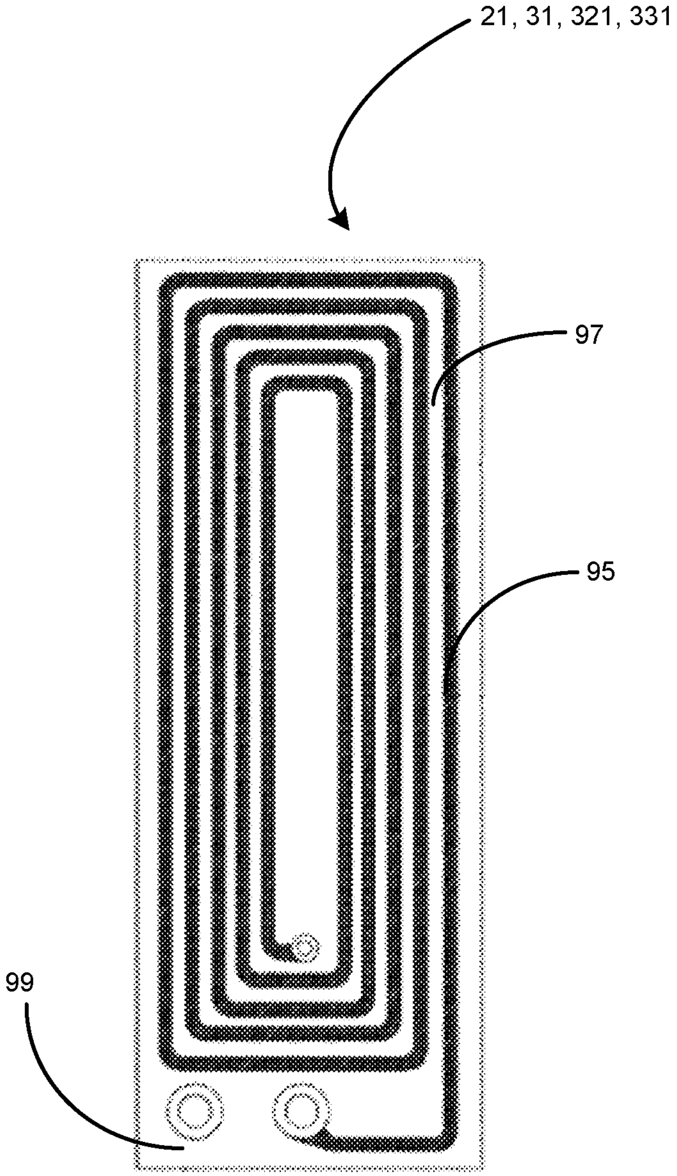
FIG. 10 is a top view of an exemplary antenna, for use as one or both of a transmission antenna and a receiver antenna of the system of FIG. 1 and/or any other systems, methods, or apparatus disclosed herein, in accordance with the present disclosure.

Turning now to FIG. 10, an exemplary, non-limiting embodiment of one or more of the transmission antenna 21, the receiver antenna 31, the transmission antenna 321, and the receiver antenna 331, that may be used with any of the systems, methods, and/or apparatus disclosed herein. In the illustrated embodiment, the antenna 21, 31, 321, 331, is a flat spiral coil configuration. In the exemplary embodiment shown, the antenna comprises four layers of alternating of an electrical conductor and electrically insulating layers integrated into a printed circuit board (PCB), flexible circuit board (FPC), or a hybrid circuit board (HCB), the HBC comprising a PCB portion and an FPC portion. As shown, the antenna 21, 31, 321, 331 comprises two antenna segments that are electrically connected in series. As shown, the antenna 21, 31, 321, 331 is constructed having five turns of a copper trace 95 deposited on the surface of an insulative substrate 99 with a gap 97 of, for example, 15 to 200 microns between each turn of the trace 95. Each segment comprises an electrical conductor (e.g., trace 95) positioned on an insulative substrate 98 in an electrical parallel configuration. Non-limiting examples can be found in U.S. Pat. Nos. 9,941,743, 9,960,628, 9,941,743 all to Peralta et al., U.S. Pat. Nos. 9,948,129, 10,063,100 to Singh et al., U.S. Pat. No. 9,941,590 to Luzinski, U.S. Pat. No. 9,960,629 to Rajagopalan et al. and U.S. Patent App. Nos. 2017/0040107, 2017/0040105, 2017/0040688 to Peralta et al., all of which are assigned to the assignee of the present application and incorporated fully herein by reference.

In addition, the antenna 21, 31, 321, 331 may be constructed having a multi-layer-multi-turn (MLMT) construction in which at least one insulator is positioned between a plurality of conductors. Non-limiting examples of antennas having an MLMT construction that may be incorporated within the wireless transmission system(s) 20 and/or the wireless receiver system(s) 30 may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, 9,300,046, all to Singh et al., assigned to the assignee of the present application are incorporated fully herein. It is also noted that other antennas such as, but not limited to, an antenna configured to send and receive signals in the UHF radio wave frequency such IEEE standard 802.15.1 may be incorporated within the systems, methods, and/or apparatus of the present invention.

Figure 11:
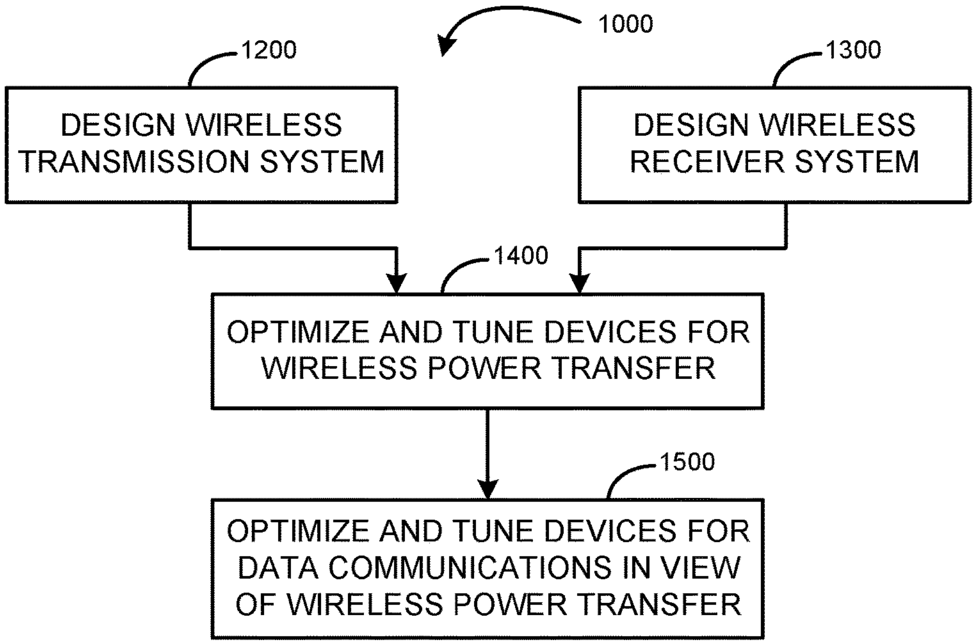
FIG. 11 is a flow chart for an exemplary method for designing a system for wireless transmission of one or more of electrical energy, electrical power, electromagnetic energy, electronic data, and combinations thereof, in accordance with FIGS. 1-10 and the present disclosure.

FIG. 11 is an example block diagram for a method 1000 for designing a system for wirelessly transferring one or more of electrical energy, electrical power, electromagnetic energy, and electronic data, in accordance with the systems, methods, and apparatus of the present disclosure. To that end, the method 1000 may be utilized to design a system in accordance with any disclosed embodiments of the systems 10, 310 and any components thereof.

At block 1200, the method 1000 includes designing a wireless transmission system for use in the system 10, 310. The wireless transmission system designed at block 1200 may be designed in accordance with one or more of the aforementioned and disclosed embodiments of the wireless transmission systems 20, 320, in whole or in part and, optionally, including any components thereof. Block 1200 may be implemented as a method 1200 for designing a wireless transmission system.

Figure 12:
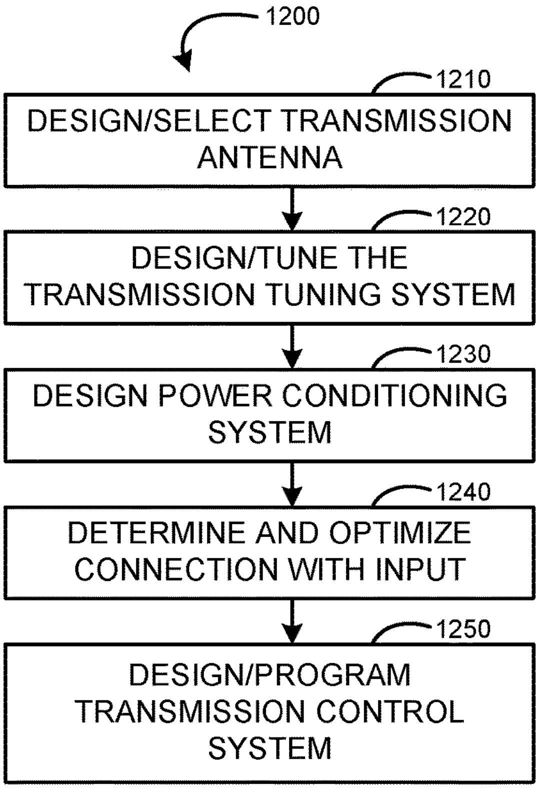
FIG. 12 is a flow chart for an exemplary method for designing a wireless transmission system for the system of FIGS. 11, in accordance with FIGS. 1-10, and the present disclosure.
Figure 13:
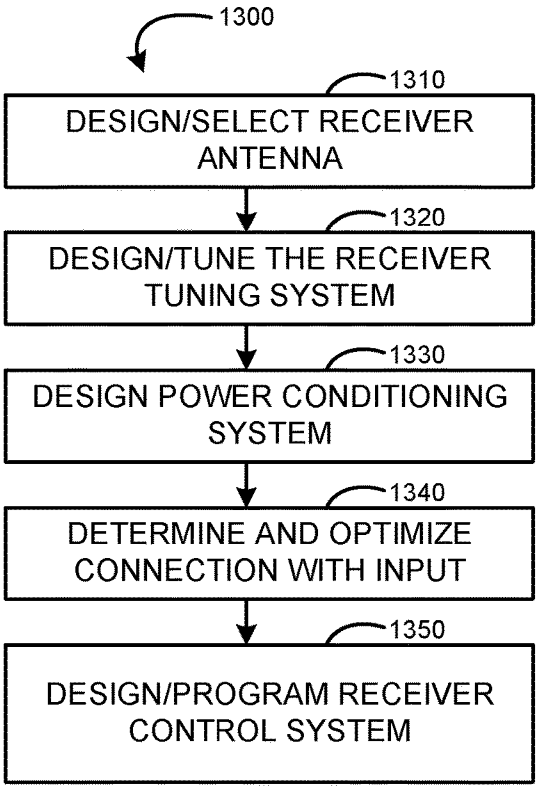
FIG. 13 is a flow chart for an exemplary method for designing a wireless receiver system for the system of FIGS. 11, in accordance with FIGS. 1-10 and the present disclosure.

Turning now to FIG. 12 and with continued reference to the method 1000 of FIG. 11, an example block diagram for the method 1200 for designing a wireless transmission system is illustrated. The wireless transmission system designed by the method 1000 may be designed in accordance with one or more of the aforementioned and disclosed embodiments of the wireless transmission systems 20, 320 in whole or in part and, optionally, including any components thereof. The method 1200 includes designing and/or selecting a transmission antenna for the wireless transmission system, as illustrated in block 1210. The designed and/or selected transmission antenna may be designed and/or selected in accordance with one or more of the aforementioned and disclosed embodiments of the transmission antenna 21, 321, in whole or in part and including any components thereof. The method 1200 includes designing and/or tuning a transmission tuning system for the wireless transmission system, as illustrated in block 1220. Such designing and/or tuning may be utilized for, but not limited to being utilized for, impedance matching, as discussed in more detail above. The designed and/or tuned transmission tuning system may be designed and/or tuned in accordance with one or more of the aforementioned and disclosed embodiments of wireless transmission systems 20, 320 in whole or in part and, optionally, including any components thereof.

The method 1200 further includes designing a power conditioning system for the wireless transmission system, as illustrated in block 1230. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40, 340, in whole or in part and, optionally, including any components thereof. Further, at block 1240, the method 1200 may determine and optimize a connection, and any associated connection components, to configure and/or optimize a connection between the input power source 12 and the power conditioning system of block 1230. Such determining, configuring, and/or optimizing may include selecting and implementing protection mechanisms and/or apparatus, selecting and/or implementing voltage protection mechanisms, among other things.

The method 1200 further includes designing and/or programing a transmission control system of the wireless transmission system of the method 1000, as illustrated in block 1250. The designed transmission control system may be designed in accordance with one or more of the aforementioned and disclosed embodiments of the transmission control system 26, 300, in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the dynamic tuning controller 350, the chipset temperature sensor 352, the amplifier current sensor 354, the amplifier voltage sensor 356, the transmission antenna temperature sensor 358, and the frequency selector 348, in whole or in part and, optionally, including any components thereof.

Returning now to FIG. 11, at block 1300, the method 1000 includes designing a wireless receiver system for use in the system 10, 310. The wireless transmission system designed at block 1300 may be designed in accordance with one or more of the aforementioned and disclosed embodiments of the wireless receiver system 30, 330 in whole or in part and, optionally, including any components thereof. Block 1300 may be implemented as a method 1300 for designing a wireless receiver system.

Turning now to FIG. 12 and with continued reference to the method 1000 of FIG. 11, an example block diagram for the method 1300 for designing a wireless receiver system is illustrated. The wireless receiver system designed by the method 1300 may be designed in accordance with one or more of the aforementioned and disclosed embodiments of the wireless receiver system 30, 330 in whole or in part and, optionally, including any components thereof. The method 1300 includes designing and/or selecting a receiver antenna for the wireless receiver system, as illustrated in block 1310. The designed and/or selected receiver antenna may be designed and/or selected in accordance with one or more of the aforementioned and disclosed embodiments of the receiver antenna 31, 331 in whole or in part and including any components thereof. The method 1300 includes designing and/or tuning a receiver tuning system for the wireless receiver system, as illustrated in block 1320. Such designing and/or tuning may be utilized for, but not limited to being utilized for, impedance matching, as discussed in more detail above. The designed and/or tuned receiver tuning system may be designed and/or tuned in accordance with one or more of the aforementioned and disclosed embodiments of the receiver tuning system 34, 334 in whole or in part and/or, optionally, including any components thereof.

The method 1300 further includes designing a power conditioning system for the wireless receiver system, as illustrated in block 1330. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32, 332 in whole or in part and, optionally, including any components thereof. Further, at block 1340, the method 1300 may determine and optimize a connection, and any associated connection components, to configure and/or optimize a connection between the load 16 and the power conditioning system of block 1330. Such determining, configuring, and/or optimizing may include selecting and implementing protection mechanisms and/or apparatus, selecting and/or implementing voltage protection mechanisms, among other things.

The method 1300 further includes designing and/or programing a receiver control system of the wireless receiver system of the method 1300, as illustrated in block 1350. The designed receiver control system may be designed in accordance with one or more of the aforementioned and disclosed embodiments of the receiver control system 36, 300 in whole or in part and, optionally, including any components thereof. Such components thereof include, but are not limited to including, the receiver controller 38, the memory 37, and the communications system 39, the load temperature sensor 362, the rectifier current sensor 364, the rectifier voltage sensor 366, the ambient temperature sensor 367, and the receiver antenna temperature sensor 368, in whole or in part and, optionally, including any components thereof.

Returning now to the method 1000 of FIG. 11, the method 1000 further includes, at block 1400, optimizing and/or tuning both the wireless transmission system and the wireless receiver system for wireless power transfer. Such optimizing and/or tuning includes, but is not limited to including, controlling and/or tuning parameters of devices to match impedance, optimize and/or configure voltage and/or power levels of an output power signal, among other things and in accordance with any of the disclosed systems, methods, and apparatus herein. Further, the method 1000 includes optimizing and/or tuning both the wireless transmission system and the wireless receiver system for data communications, in view of system characteristics necessary for wireless power transfer. Such optimizing and/or tuning includes, but is not limited to including, optimizing power characteristics for concurrent transmission of electrical energy and electrical data signals, tuning quality factors of antennas for different transmission schemes, among other things and in accordance with any of the disclosed systems, methods, and apparatus herein.

Figure 14:
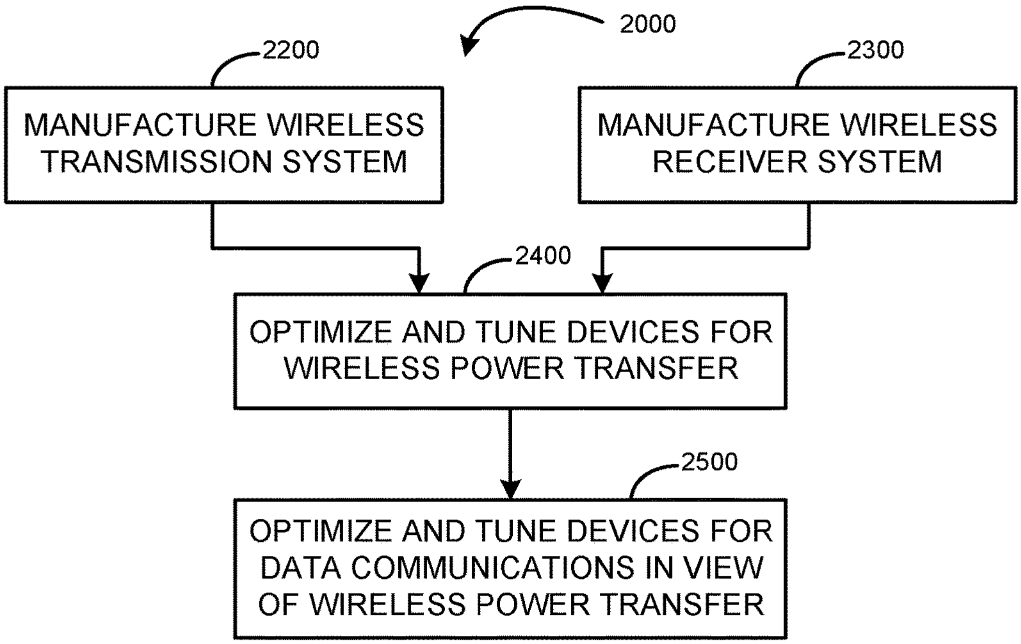
FIG. 14 is a flow chart for an exemplary method for manufacturing a system for wireless transmission of one or more of electrical energy, electrical power, electrical electromagnetic energy, electronic data, and combinations thereof, in accordance with FIGS. 1-10 and the present disclosure.

FIG. 14 is an example block diagram for a method 2000 for manufacturing a system for wirelessly transferring one or both of electrical energy and electronic data, in accordance with the systems, methods, and apparatus of the present disclosure. To that end, the method 2000 may be utilized to manufacture a system in accordance with any disclosed embodiments of the systems 10, 310 and any components thereof.

At block 2200, the method 2000 includes manufacturing a wireless transmission system for use in the system 10, 310. The wireless transmission system manufactured at block 2200 may be designed in accordance with one or more of the aforementioned and disclosed embodiments of the wireless transmission systems 20, 320 in whole or in part and, optionally, including any components thereof. Block 2200 may be implemented as a method 2200 for manufacturing a wireless transmission system.

Figure 15:
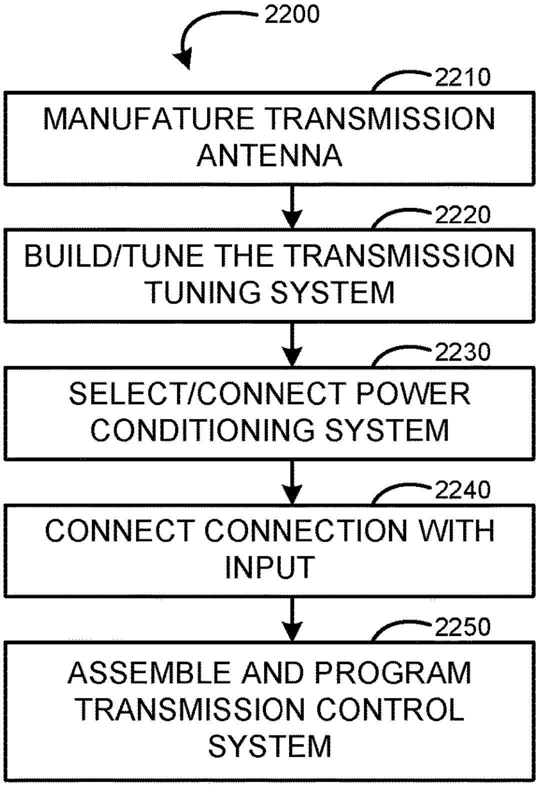
FIG. 15 is a flow chart for an exemplary method for designing a wireless transmission system for the system of FIG. 14, in accordance with FIGS. 1-10 and the present disclosure.

Turning now to FIG. 15 and with continued reference to the method 2000 of FIG. 14, an example block diagram for the method 2200 for manufacturing a wireless transmission system is illustrated. The wireless transmission system manufactured by the method 2000 may be manufactured in accordance with one or more of the aforementioned and disclosed embodiments of the wireless transmission systems 20, 320 in whole or in part and, optionally, including any components thereof. The method 2200 includes manufacturing a transmission antenna for the wireless transmission system, as illustrated in block 2210. The manufactured transmission system may be built and/or tuned in accordance with one or more of the aforementioned and disclosed embodiments of the transmission antenna 21, 321, in whole or in part and including any components thereof. The method 2200 includes building and/or tuning a transmission tuning system for the wireless transmission system, as illustrated in block 2220. Such designing and/or tuning may be utilized for, but not limited to being utilized for, impedance matching, as discussed in more detail above. The built and/or tuned transmission tuning system may be designed and/or tuned in accordance with one or more of the aforementioned and disclosed embodiments of the transmission tuning system 24, 324, in whole or in part and, optionally, including any components thereof.

The method 2200 further includes selecting and/or connecting a power conditioning system for the wireless transmission system, as illustrated in block 2230. The power conditioning system manufactured may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40, 340 in whole or in part and, optionally, including any components thereof. Further, at block 2240, the method 2200 may determine and optimize a connection, and any associated connection components, to configure and/or optimize a connection between the input power source 12 and the power conditioning system of block 2230. Such determining, configuring, and/or optimizing may include selecting and implementing protection mechanisms and/or apparatus, selecting and/or implementing voltage protection mechanisms, among other things.

The method 2200 further includes assembling and/or programing a transmission control system of the wireless transmission system of the method 2000, as illustrated in block 2250. The assembled transmission control system may be designed in accordance with one or more of the aforementioned and disclosed embodiments of the transmission control system 26 in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the dynamic tuning controller 350, the chipset temperature sensor 352, the amplifier current sensor 354, the amplifier voltage sensor 356, the transmission antenna temperature sensor 358, and the frequency selector 348, in whole or in part and, optionally, including any components thereof.

Returning now to FIG. 14, at block 2300, the method 2000 includes manufacturing a wireless receiver system for use in the system 10, 310. The wireless transmission system manufactured at block 2300 may be designed in accordance with one or more of the aforementioned and disclosed embodiments of the wireless receiver system 30, 330 in whole or in part and, optionally, including any components thereof. Block 2300 may be implemented as a method 2300 for manufacturing a wireless receiver system.

Figure 16:
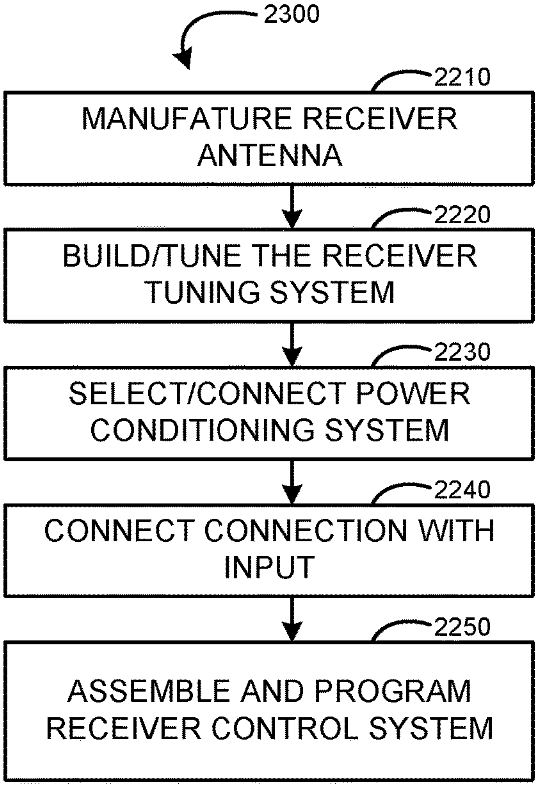
FIG. 16 is a flow chart for an exemplary method for designing a wireless receiver system for the system of FIG. 14, in accordance with FIGS. 1-10 and the present disclosure.

Turning now to FIG. 16 and with continued reference to the method 2000 of FIG. 14, an example block diagram for the method 2300 for manufacturing a wireless receiver system is illustrated. The wireless receiver system manufactured by the method 2000 may be designed in accordance with one or more of the aforementioned and disclosed embodiments of the wireless receiver system 30, 330 in whole or in part and, optionally, including any components thereof. The method 2300 includes manufacturing a receiver antenna for the wireless receiver system, as illustrated in block 2310. The manufactured receiver antenna may be manufactured, designed, and/or selected in accordance with one or more of the aforementioned and disclosed embodiments of the receiver antenna 31 in whole or in part and including any components thereof. The method 2300 includes building and/or tuning a receiver tuning system for the wireless receiver system, as illustrated in block 2320. Such building and/or tuning may be utilized for, but not limited to being utilized for, impedance matching, as discussed in more detail above. The built and/or tuned receiver tuning system may be designed and/or tuned in accordance with one or more of the aforementioned and disclosed embodiments of the receiver tuning system 34 in whole or in part and, optionally, including any components thereof.

The method 2300 further includes selecting and/or connecting a power conditioning system for the wireless receiver system, as illustrated in block 2330. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32, 332 in whole or in part and, optionally, including any components thereof. Further, at block 2340, the method 2300 may determine and optimize a connection, and any associated connection components, to configure and/or optimize a connection between the load 16, 316 and the power conditioning system of block 2330. Such determining, configuring, and/or optimizing may include selecting and implementing protection mechanisms and/or apparatus, selecting and/or implementing voltage protection mechanisms, among other things.

The method 2300 further includes assembling and/or programing a receiver control system of the wireless receiver system of the method 2300, as illustrated in block 2350. The assembled receiver control system may be designed in accordance with one or more of the aforementioned and disclosed embodiments of the receiver control system 36, 336 in whole or in part and, optionally, including any components thereof. Such components thereof include, but are not limited to including, the receiver controller 38, the memory 37, and the communications system 39, the load temperature sensor 362, the rectifier current sensor 364, the rectifier voltage sensor 366, the ambient temperature sensor 367, and the receiver antenna temperature sensor 368 in whole or in part and, optionally, including any components thereof.

Returning now to the method 2000 of FIG. 14, the method 2000 further includes, at block 2400, optimizing and/or tuning both the wireless transmission system and the wireless receiver system for wireless power transfer. Such optimizing and/or tuning includes, but is not limited to including, controlling and/or tuning parameters of devices to match impedance, optimize and/or configure voltage and/or power levels of an output power signal, among other things and in accordance with any of the disclosed systems, methods, and apparatus herein. Further, the method 2000 includes optimizing and/or tuning both the wireless transmission system and the wireless receiver system for data communications, in view of system characteristics necessary for wireless power transfer, as illustrated at block 2500. Such optimizing and/or tuning includes, but is not limited to including, optimizing power characteristics for concurrent transmission of electrical energy and electrical data signals, tuning quality factors of antennas for different transmission schemes, among other things and in accordance with any of the disclosed systems, methods, and apparatus herein.

The systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment the system may transmit electrical power on the order of about 100 microwatts (W) to about 10 W. In another embodiment, electrical power up to around about 500 W may also be transmitted. Specifically considering near field magnetic coupling (NFMC) as the mechanism of wireless power transfer between the wireless transmission systems 20, 320 and the wireless receiver systems 30, 330, it is well known that smaller sizes are generally more easily achievable if a higher operating frequency is selected. This is due to the inverse relationship of the required mutual inductance and the frequency of operation, as indicated by the following equation:

$$M = \frac{V_{induced}}{j * \omega * I_{Tx}}$$

where:

$V_{induced}$ is induced voltage on the receiver antenna coil $I_{tx}$ is the AC current flowing through the transmitter antenna coil, and ω is the operating frequency multiplied by 2π.

Since the required mutual inductance increases in order to enable the wireless transfer of electrical energy having increased, it is necessary to increase the inductance or coupling of the transmitter or receiver while minimizing AC losses. Mutual inductance can be calculated by the following relationship:

$$M = k * \sqrt{L_{Tx} * L_{Rx}},$$

where:

M is the mutual inductance of the system, k is the coupling of the system, $L_{Tx}$ is the inductance of the transmitter antenna coil, and $L_{Rx}$ is the inductance of the receiver antenna coil.

As the form factor of the antenna coil is reduced, attaining the required inductance on either the receiver or transmitter is accompanied by an increase in antenna coil resistance as the high number of turns required leads to a reduction in trace width. This increase in resistance typically reduces the quality factor of the antenna coil and overall coil to coil efficiency of the system where the Quality factor is defined as:

$$Q = \frac{\omega * L}{R},$$

where:

Q is the quality factor of the antenna coil,

L is the inductance of the antenna coil,

ω is the operating frequency of the antenna coil in radians/second (alternatively, if the frequency of operation is in Hz, the operating frequency is ω divided by 2π), R is the equivalent series resistance (ESR) at the operating frequency.

Further, transmission (Tx) antenna coil to receiver (Rx) antenna coil efficiency (Eff) is defined by the following equation:

$$Eff = \frac{k^2 * Q_{Rx} * Q_{Tx}}{1 + \sqrt{1 + k^2 * Q_{Rx} * Q_{Tx}}},$$

where:

k is the coupling of the system, $Q_{Rx}$ is the quality factor of the receiver antennal, and $Q_{Tx}$ is the quality factor of the transmission antenna.

In an embodiment, a ferrite shield may be incorporated within the antenna structure to improve antenna performance. Selection of the ferrite shield material is dependent on the operating frequency as the complex magnetic permeability (μ=μ'−j*μ") is frequency dependent. The material may be a sintered flexible ferrite sheet, a rigid shield, or a hybrid shield, wherein the hybrid shield comprises a rigid portion and a flexible portion. Additionally, the ferrite shield may be composed of varying material compositions. Examples of materials may include, but are not limited to, zinc comprising ferrite materials such as manganese-zinc, nickel-zinc, copper-zinc, magnesium-zinc, and combinations thereof.

In addition, depending on the operating frequency and power requirements of the system 10, 310, a hybrid antenna construction comprising a Litz wire and a PCB coil combination may be desired to efficiently transfer power. In an embodiment, a hybrid Litz wire and PCB coil combination may comprise the transmission antenna 21, 321 or the receiver antenna 31, 331 of a wrapped Litz wire construction and the other of the transmission antenna 21, 321 or the receiver antenna 31, 331 may be constructed having a coil disposed on a surface of a circuit board such as the antenna shown in FIG. 17. Lower operating frequencies on the order of 100 kHz to several MHz range may require a certain mutual inductance between the transmission and receiver antenna 21, 31, 321, 331. This is attainable by using a transmission antenna 21, 321 of a Litz wire construction having a novel ferrite core in combination with a receiver antenna 31, 331 comprising a coil disposed on a surface of a circuit board, such as the antenna shown in FIG. 10.

In order to increase mutual inductance, the coupling and/or inductance of the transmission system 20, 320 or the receiver system 30, 330 must be increased. However, due to the small form factor constraints, coupling is limited by the physical size of the connector systems. It is noted that using transmitter and receiver antennas 21, 31, 321, 331 of a construction comprising a coil disposed on the surface of a circuit board, such as the antenna shown in FIG. 10, may increase inductance and increase the resistance of the antenna coils thereby decreasing the quality factor Q and antenna to antenna efficiency.

In an embodiment, the system 10, 310 comprising a wireless transmission system 20, 320 having a transmission antenna 21, 321 of a Litz-wire construction and a shielding material and a receiver system 30, 330 having a receiver antenna 31, 331 comprising a coil disposed on a surface of a circuit board (FIG. 10) may be used to increase the coupling and mutual inductance of an exemplary small form factor of the system 10, 310. To achieve a higher antenna to antenna efficiency, this configuration may be used to achieve the necessary power transfer while maintaining high Q factor at lower frequencies. These improvements may also increase the overall performance of an exemplary system 10, 310 having a relatively small form factor.

The choice of coil design and construction is determined by a combination of the following electrical and magnetic parameters: inductance (L), equivalent series resistance (ESR) at the operating frequency, coupling (k), and Mutual inductance. For lower operating frequencies, i.e., from about 100 kHz to about 10 MHz, and for achieving increased power transmission on the order of about 0.1 mm to about 100 mm, this particular antenna topology is beneficial. For example, per the mutual inductance equations, if the power to be delivered to a load is constant, while the operating frequency decreases, the mutual inductance between the transmitter and receiver antenna coils increases at a constant transmit current. Table I illustrates the improvement in mutual inductance. Table II illustrates the improvement in coupling and Table III illustrates the improvement in antenna to antenna efficiency.

TABLE I

| Transmitter Antenna Construction | Transmitter Antenna Shield | Receiver Antenna Construction | M (μH) |
|---|---|---|---|
| Coil on FR4 PCB | Sheet | Coil on FR4 PCB | 0.35 |
| Litz Wire | T-Core | Coil on FR4 PCB | 1.35 |

TABLE II

| Transmitter Antenna Construction | Transmitter Antenna Shield | Receiver Antenna Construction | Coupling |
|---|---|---|---|
| Coil on FR4 PCB | Sheet | Coil on FR4 PCB | 0.26 |
| Litz Wire | T-Core | Coil on FR4 PCB | 0.29 |

TABLE III

| Transmitter Antenna Construction | Transmitter Antenna Shield | Receiver Antenna Construction | Antenna to Antenna Efficiency |
|---|---|---|---|
| Coil on FR4 PCB | Sheet | Coil on FR4 PCB | 57.9% |
| Litz Wire | T-Core | Coil on FR4 PCB | 80.8% |

In addition, if the system 10 is operated at a higher frequency, i.e., on the order of about 1 MHz or greater, the required mutual inductance will be reduced, thereby allowing for smaller transmitter and receiver antennas 21, 31, 321, 331, wireless transmission systems 20, 320, wireless receiver systems 30, 330. As defined herein, shielding material is a material that captures a magnetic field. An example of which is a ferrite material. In the embodiments detailed in Tables I-III, a sheet of ferrite material is positioned directly adjacent to the transmission antenna 21, for example, behind the transmission antenna 21, 321. As defined herein a "T-Core" shielding material is a magnetic field shield assembly comprising a sheet of shielding material, such as a ferrite material, placed directly behind the transmitter or receiver antenna 21, 31, 321, 331 and an additional second shielding material, such as a ferrite material, placed within the inside area of a coil in the plane of the transmitter or receiver antenna 21, 31, 321, 331. Furthermore, the wireless transmission system 20 or the wireless receiver system 30, 330 may be constructed having the respective transmitter or receiver antennas 21, 31, 321, 331 comprising a "C-core" shielding material in which the shielding material, such as a ferrite material, configured similarly to the letter "C", is positioned adjacent to the antenna 21, 31, 321, 331. In addition, the wireless transmission system 20, 320 or the wireless receiver system 30, 330 may be constructed having the respective transmitter or receiver antennas 21, 31, 321, 331 comprising a "E-core" shielding material in which the shielding material, such as a ferrite material, configured similarly to the letter "E", is positioned adjacent to the antenna 21, 31, 321, 331.

Utilizing relatively small sized printed circuit board or flexible printed circuit board (PCB/FPC) based coil-antennas allow for appropriate stackups, appropriate trace widths, gap widths and copper (or other conductive material) depths that are more suitable for higher frequencies. Further, printed circuit board and flex printed circuit board-based, coil-antennas are highly integrated into the PCB fabrication process, thereby allowing for integration with the rest of the circuitry. This also allows for the integration of MLMT antenna designs to reduce ESR and improve the Q of the antennas.

Furthermore, utilizing coils in a layered approach allows for other fabrication processes, for example, printing, printing on fabrics, semiconductor fabrication processes, such as a low temperature co-fired ceramic (LTCC) process, a high temperature co-fired ceramic (HTCC) process, and the like.

Small form factor PCB coil designs are suitable at higher operating frequencies due to a lower required inductance while maintaining a low coil ESR to minimize the power dissipated in the transmit and receive coils. Printed circuit board (PCB) coil antennas offer additional benefits from a manufacturing, cost and assembly standpoint compared to wire-wound antenna coil solutions. For applications with a strict requirement for overall assembly thickness, printed circuit board (PCB) coil antennas are preferred due to the reduced thickness possible even with multilayer construction.

The ferrite shield material selected for the coil combination also depends on the operating frequency as the complex magnetic permeability ($\mu=\mu'-j*\mu''$) is frequency dependent. The material may be a sintered flexible ferrite sheet or a rigid shield and be composed of varying material compositions.

It is noted that the construction of the antenna 21, 31, 321, 331 is non-limiting. The antenna that is incorporated within a system may comprise magnetic wires or have a stamped metal construction. Furthermore, the antenna 21, 31, 321, 331 may utilize thick film, thin film or other printing fabrication technologies in its construction.

In an embodiment, incorporation of a transmitter or receiver antenna 21, 31, 321, 331 having a multi-layer-multi-turn (MLMT) construction significantly reduces the equivalent series resistance (ESR) of the respective wireless transmission systems 20 and wireless receiver systems 30, 330 and the wireless connection system 10, 310 of the present invention. The inventors have discovered that incorporation of at least one transmitter and receiver antenna 21, 31, 321, 331 having a multi-layer-multi-turn (MLMT) construction reduces equivalent series resistance (ESR) of the wireless transmission system 20, 320 or wireless receiver system 30, 330 by about 50 percent.

Furthermore, reducing ESR improves the overall system efficiency and reduces heating in the antenna 21, 31, 321, 331 and the system 10, 310 by reducing the ($I^2\times R$) losses in the coil. Table IV shown below details the measured ESR for two multi-layer-multi-turn (MLMT) antenna designs in comparison to an antenna constructed comprising Litz wire wrapped around an inductor. As shown in Table IV below, the antenna constructed with an MLMT design exhibited a lower inductance, (0.60 μH) and a lower equivalent series resistance (ESR) (0.50Ω) in comparison to the antenna having a traditional wound Litz wire construction. Thus, the transmitter or receiver antenna 21, 31, 321, 331 having a multi-layer-multi-turn (MLMT) construction contributes to the increased electrical performance of increased electrical power transmission and increased system separation distance of the gap 17 of the system 10, 310 of the present invention.

TABLE III

| Antenna Design | Frequency (MHz) | Inductance (μH) | ESR (Ω) |
|---|---|---|---|
| Litz Wire | 2 | 3.80 | 0.97 |
| MLMT | 2 | 0.60 | 0.50 |
| MLMT | 10 | 0.65 | 1.05 |

Exemplary ways of connecting the system to a host device include, but are not limited to, directly soldering or placing the at least one wireless transmission system 20 and wireless receiver systems 30 on a circuit board or a host device. Alternatively, the at least one wireless transmission system 20 and wireless receiver systems 30, 330 could be connected to a circuit board or a host device using a wire/cable. Once connected to a host device the full structure or at least a portion of the structure of the at least one wireless transmission system 20 and wireless receiver systems 30, 330 may be encapsulated within an insulative coating.

In another embodiment, the system 10, 310 of the present application could include a system that can operate both as a transmitter and as a receiver, (e.g., a transceiver). In a further embodiment, the system 10 of the present application may comprise a power and data transfer system in addition to a single antenna where the data is modulated into the power frequency.

In another embodiment, the system 10, 310 of the present invention may comprise multiple antennas within each wireless transmission system 20, 320 and wireless receiver systems 30, 330. If a multiple antenna system is employed, then the first antenna could be reserved for identification, diagnostics and any uni- or bi-directional data transfer, while the second antenna can be dedicated to power transfer.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

The invention claimed is:

1. A wireless power transmitter for use in a wireless power transfer system comprising the wireless power transmitter and a wireless power receiver, the wireless power transmitter comprising:

a voltage regulator that is operable to produce a supply voltage based on a voltage-regulator control signal that specifies a configurable voltage level of the supply voltage;

an inverter that is operable to produce an alternating current (AC) signal based on the supply voltage and a drive signal having a configurable frequency;

a capacitor circuit that comprises a bank of two or more capacitors and is operable to (i) configure the bank of two or more capacitors based on a capacitor-circuit control signal that specifies a configuration state of the bank of two or more capacitors, and (ii) tune the AC signal with the bank of two or more capacitors and thereby produce a tuned AC signal;

a transmission antenna that is operable to produce a wireless power signal for receipt by at least one receiver antenna of the wireless power receiver based on the tuned AC signal; and a transmitter-side control system that is operable to:

dynamically control the configurable frequency of the drive signal by:

setting the configurable frequency of the drive signal to a first operating frequency selected from an available set of two or more operating frequencies; and based on a first set of one or more system parameters associated with operation of the wireless power transfer system, (i) determining that the configurable frequency of the drive signal is to be updated from the first operating frequency to a second operating frequency selected from the available set of two or more operating frequencies and (ii) updating the configurable frequency of the drive signal to the second operating frequency;

dynamically control the configurable voltage level of the supply voltage by:

providing, to the voltage regulator, a first voltage-regulator control signal that specifies a first voltage level of the supply voltage and thereby causes the voltage regulator to produce a first supply voltage having the first voltage level; and based on a second set of one or more system parameters associated with operation of the wireless power transfer system, (i) determining that the configurable voltage level of the supply voltage is to be updated from the first voltage level to a second voltage level and (ii) providing, to the voltage regulator, a second voltage-regulator control signal that specifies the second voltage level of the supply voltage and thereby causes the voltage regulator to produce a second supply voltage having the second voltage level; and dynamically control the configuration state of the bank of two or more capacitors by:

providing, to the capacitor circuit, a first capacitor-circuit control signal that specifies a first configuration state of the bank of two or more capacitors and thereby causes the bank of two or more capacitors to be configured into the first configuration state; and based on a third set of one or more system parameters associated with operation of the wireless power transfer system, (i) determining that the configuration state of the bank of two or more capacitors is to be updated from the first configuration state to a second configuration state and (ii) providing, to the capacitor circuit, a second capacitor-circuit control signal that specifies the second configuration state and thereby causes the bank of two or more capacitors to be configured into the second configuration state.

2. The wireless power transmitter of claim 1, wherein:

the first set of one or more system parameters associated with operation of the wireless power transfer system comprises at least a first receiver-level parameter that is reported from the wireless power receiver to the wireless power transmitter;

the second set of one or more system parameters associated with operation of the wireless power transfer system comprises at least a second receiver-level parameter that is reported from the wireless power receiver to the wireless power transmitter; and the third set of one or more system parameters associated with operation of the wireless power transfer system comprises a combination of transmitter-level and receiver-level parameters.

3. The wireless power transmitter of claim 2, wherein the first receiver-level parameter comprises an indication of power capabilities of the wireless power receiver.

4. The wireless power transmitter of claim 2, wherein the second receiver-level parameter comprises an indication of an extent of power received by the wireless power receiver.

5. The wireless power transmitter of claim 2, the combination of transmitter-level and receiver-level parameters provides an indication of coupling between the wireless power transmitter and the wireless power receiver.

6. The wireless power transmitter of claim 2, wherein the combination of transmitter-level and receiver-level parameters comprises at least (i) an indication of one or both of an output voltage or an output current of the inverter of the wireless power transmitter and (ii) an indication of an output voltage of a rectifier of the wireless power receiver that is reported from the wireless power receiver to the wireless power transmitter.

7. The wireless power transmitter of claim 1, wherein the transmitter-side control system is further operable to:

transmit, to the wireless power receiver via the transmission antenna, an instructed receiver-level parameter that is (i) determined by the transmitter-side control system and (ii) utilized by the wireless power receiver to set a power level of an output delivered to a load of the wireless power receiver.

8. The wireless power transmitter of claim 7, wherein the instructed receiver-level parameter is determined by the transmitter-side control system based on a combination of transmitter-level and receiver-level parameters.

9. The wireless power transmitter of claim 8, wherein the combination of transmitter-level and receiver-level parameters comprises at least (i) an indication of one or both of an output voltage or an output current of the inverter of the wireless power transmitter and (ii) an indication of an extent of power received by the wireless power receiver that is reported from the wireless power receiver to the wireless power transmitter.

10. The wireless power transmitter of claim 1, wherein dynamically controlling the configurable frequency of the drive signal further comprises:

generating the drive signal having the configurable frequency.

11. The wireless power transmitter of claim 1, wherein:

the first operating frequency is a frequency within a given frequency range of about 110 kilohertz (kHz) to about 205 kHz; and the second operating frequency is a frequency that is higher than the given frequency range.

12. The wireless power transmitter of claim 1, wherein the capacitor circuit further comprises switching circuitry for controlling a connection state of at least a subset of the two or more capacitors in the bank.

13. The wireless power transmitter of claim 12, wherein the switching circuitry comprises at least (i) a first switch for controlling a connection state of at least a first capacitor in the bank and (ii) a second switch for controlling a connection state of at least a second capacitor in the bank, and wherein the capacitor circuit is operable to configure the bank of two or more capacitors in accordance with the capacitor-circuit control signal by switching one or both of the first switch or the second switch in order to place the bank of two or more capacitors into the configuration state specified by the capacitor-circuit control signal.

14. A method of operating a wireless power transmitter for use in a wireless power transfer system comprising the wireless power transmitter and a wireless power receiver, wherein the wireless power transmitter comprises (i) a voltage regulator that is operable to produce a supply voltage in accordance with a voltage-regulator control signal that specifies a configurable voltage level of the supply voltage, (ii) an inverter that is operable to produce an alternating current (AC) signal based on the supply voltage and a drive signal having a configurable frequency, (iii) a capacitor circuit that comprises a bank of two or more capacitors and is operable to configure the bank of two or more capacitors and tune the AC signal, and (iv) a transmission antenna that is operable to produce a wireless power signal for receipt by at least one receiver antenna of the wireless power receiver, the method comprising:

dynamically controlling the configurable frequency of the drive signal by:

setting the configurable frequency of the drive signal to a first operating frequency selected from an available set of two or more operating frequencies; and based on a first set of one or more system parameters associated with operation of the wireless power transfer system, (i) determining that the configurable frequency of the drive signal is to be updated from the first operating frequency to a second operating frequency selected from the available set of two or more operating frequencies and (ii) updating the configurable frequency of the drive signal to the second operating frequency;

dynamically controlling the configurable voltage level of the supply voltage by:

providing, to the voltage regulator, a first voltage-regulator control signal that specifies a first voltage level of the supply voltage and thereby causes the voltage regulator to produce a first supply voltage having the first voltage level; and based on a second set of one or more system parameters associated with operation of the wireless power transfer system, (i) determining that the configurable voltage level of the supply voltage is to be updated from the first voltage level to a second voltage level and (ii) providing, to the voltage regulator, a second voltage-regulator control signal that specifies the second voltage level of the supply voltage and thereby causes the voltage regulator to produce a second supply voltage having the second voltage level; and dynamically controlling a configuration state of the bank of two or more capacitors by:

providing, to the capacitor circuit, a first capacitor-circuit control signal that specifies a first configuration state of the bank of two or more capacitors and thereby causes the bank of two or more capacitors to be configured into the first configuration state; and based on a third set of one or more system parameters associated with operation of the wireless power transfer system, (i) determining that the configuration state of the bank of two or more capacitors is to be updated from the first configuration state to a second configuration state and (ii) providing, to the capacitor circuit, a second capacitor-circuit control signal that specifies the second configuration state and thereby causes the bank of two or more capacitors to be configured into the second configuration state.

15. The method of claim 14, wherein:

the first set of one or more system parameters associated with operation of the wireless power transfer system comprises at least a first receiver-level parameter that is reported from the wireless power receiver to the wireless power transmitter;

the second set of one or more system parameters associated with operation of the wireless power transfer system comprises at least a second receiver-level parameter that is reported from the wireless power receiver to the wireless power transmitter; and the third set of one or more system parameters associated with operation of the wireless power transfer system comprises a combination of transmitter-level and receiver-level parameters.

16. The method of claim 15, wherein:

the first receiver-level parameter comprises an indication of power capabilities of the wireless power receiver;

the second receiver-level parameter comprises an indication of an extent of power received by the wireless power receiver; and the combination of transmitter-level and receiver-level parameters comprises at least (i) an indication of one or both of an output voltage or an output current of the inverter of the wireless power transmitter and (ii) an indication of an output voltage of a rectifier of the wireless power receiver that is reported from the wireless power receiver to the wireless power transmitter.

17. The method of claim 14, further comprising:

transmitting, to the wireless power receiver via the transmission antenna, an instructed receiver-level parameter that is (i) determined at the wireless power transmitter based on a combination of transmitter-level and receiver-level parameters and (ii) utilized by the wireless power receiver to set a power level of an output delivered to a load of the wireless power receiver.

18. The method of claim 15, wherein the combination of transmitter-level and receiver-level parameters comprises at least (i) an indication of one or both of an output voltage or an output current of the inverter of the wireless power transmitter and (ii) an indication of an extent of power received by the wireless power receiver that is reported from the wireless power receiver to the wireless power transmitter.

19. A wireless power transmitter for use in a wireless power transfer system comprising the wireless power transmitter and a wireless power receiver, the wireless power transmitter comprising:

a voltage regulator that is operable to produce a supply voltage based on a voltage-regulator control signal that specifies a configurable voltage level of the supply voltage;

an inverter that is operable to produce an alternating current (AC) signal based on the supply voltage and a drive signal having a configurable frequency;

a capacitor circuit that comprises a bank of two or more capacitors and is operable to (i) configure the bank of two or more capacitors based on a capacitor-circuit control signal that specifies a configuration state of the bank of two or more capacitors, and (ii) tune the AC signal with the bank of two or more capacitors and thereby produce a tuned AC signal;

a transmission antenna that is operable to produce a wireless power signal for receipt by at least one receiver antenna of the wireless power receiver based on the tuned AC signal; and a transmitter-side control system that is operable to:

dynamically control the configurable frequency of the drive signal by:

setting the configurable frequency of the drive signal to a first operating frequency selected from an available set of two or more operating frequencies; and based on at least a first receiver-level parameter that is reported from the wireless power receiver to the wireless power transmitter, (i) determining that the configurable frequency of the drive signal is to be updated from the first operating frequency to a second operating frequency selected from the available set of two or more operating frequencies and (ii) updating the configurable frequency of the drive signal to the second operating frequency;

dynamically control the configurable voltage level of the supply voltage by:

providing, to the voltage regulator, a first voltage-regulator control signal that specifies a first voltage level of the supply voltage and thereby causes the voltage regulator to produce a first supply voltage having the first voltage level; and based on at least a second receiver-level parameter that is reported from the wireless power receiver to the wireless power transmitter, (i) determining that the configurable voltage level of the supply voltage is to be updated from the first voltage level to a second voltage level and (ii) providing, to the voltage regulator, a second voltage-regulator control signal that specifies the second voltage level of the supply voltage and thereby causes the voltage regulator to produce a second supply voltage having the second voltage level;

dynamically control the configuration state of the bank of two or more capacitors by:

providing, to the capacitor circuit, a first capacitor-circuit control signal that specifies a first configuration state of the bank of two or more capacitors and thereby causes the bank of two or more capacitors to be configured into the first configuration state; and based on a first combination of transmitter-level and receiver-level parameters, (i) determining that the configuration state of the bank of two or more capacitors is to be updated from the first configuration state to a second configuration state and (ii) providing, to the capacitor circuit, a second capacitor-circuit control signal that specifies the second configuration state and thereby causes the bank of two or more capacitors to be configured into the second configuration state; and transmit, to the wireless power receiver via the transmission antenna, an instructed receiver-level parameter that is (i) determined by the transmitter-side control system based on a second combination of transmitter-level and receiver-level parameters and (ii) utilized by the wireless power receiver to set a power level of an output delivered to a load of the wireless power receiver.

20. The wireless power transmitter of claim 19, wherein:

the first receiver-level parameter comprises an indication of power capabilities of the wireless power receiver;

the second receiver-level parameter comprises an indication of an extent of power received by the wireless power receiver; and the first combination of transmitter-level and receiver-level parameters comprises at least (i) an indication of one or both of an output voltage or an output current of the inverter of the wireless power transmitter and (ii) an indication of an output voltage of a rectifier of the wireless power receiver that is reported from the wireless power receiver to the wireless power transmitter.

* * * * *